(12) United States Patent
Cho et al.

(10) Patent No.: US 9,313,442 B2
(45) Date of Patent: Apr. 12, 2016

(54) METHOD AND APPARATUS FOR GENERATING A BROADCAST BIT STREAM FOR DIGITAL BROADCASTING WITH CAPTIONS, AND METHOD AND APPARATUS FOR RECEIVING A BROADCAST BIT STREAM FOR DIGITAL BROADCASTING WITH CAPTIONS

(75) Inventors: Bong-je Cho, Busan (KR); Yong-tae Kim, Seoul (KR); Yong-seok Jang, Hwaseong-si (KR); Dae-jong Lee, Suwon-si (KR); Jae-seung Kim, Yongin-si (KR); Ju-hee Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 640 days.

(21) Appl. No.: 13/641,327

(22) PCT Filed: Apr. 14, 2011

(86) PCT No.: PCT/KR2011/002668
§ 371 (c)(1),
(2), (4) Date: Oct. 15, 2012

(87) PCT Pub. No.: WO2011/129631
PCT Pub. Date: Oct. 20, 2011

(65) Prior Publication Data
US 2013/0027514 A1    Jan. 31, 2013

Related U.S. Application Data

(60) Provisional application No. 61/324,011, filed on Apr. 14, 2010, provisional application No. 61/353,725, filed on Jun. 11, 2010.

(51) Int. Cl.
*H04N 15/00* (2006.01)
*H04N 13/00* (2006.01)
(Continued)

(52) U.S. Cl.
CPC ......... *H04N 5/44513* (2013.01); *H04N 13/007* (2013.01); *H04N 13/0048* (2013.01);
(Continued)

(58) Field of Classification Search
CPC ............ H04N 21/4345; H04N 21/435; H04N 13/007; H04N 21/2362; H04N 21/8146; H04N 13/0022; H04N 13/0066; H04N 21/23605
USPC .................................................... 348/42–60
See application file for complete search history.

(56) References Cited

U.S. PATENT DOCUMENTS 8,509,593 B2    8/2013 Okubo et al.
2009/0142041 A1*  6/2009 Nagasawa et al. ............ 386/124
(Continued)

FOREIGN PATENT DOCUMENTS

CN    101653011 A    2/2010
CN    101954606 A    1/2011
(Continued)

OTHER PUBLICATIONS

International Search Report for PCT/KR2011/002668 dated Oct. 21,2011 [PCT/ISA/210].
(Continued)

*Primary Examiner* — Andy Rao
*Assistant Examiner* — Jared Walker
(74) *Attorney, Agent, or Firm* — Sughrue Mion, PLLC

(57) ABSTRACT

A method of generating a broadcasting bitstream for a digital caption broadcast, the method including: receiving video data in which a video including at least one of a two-dimensional (2D) video and a three-dimensional (3D) video is encoded; determining caption data for reproduction in conjunction with the video, and 3D caption converting information including information relating to a converting speed of an offset for reproducing the caption data as a 3D caption; and outputting a bitstream for a digital broadcast by multiplexing the received video data, the determined caption data, and the determined 3D caption converting information.

15 Claims, 18 Drawing Sheets

(51) Int. Cl.

| | | |
|---|---|---|
| *H04N 5/445* | (2011.01) | |
| *H04N 13/04* | (2006.01) | |
| *H04N 21/488* | (2011.01) | |
| *H04N 21/236* | (2011.01) | |
| *H04N 21/2362* | (2011.01) | |
| *H04N 21/434* | (2011.01) | |
| *H04N 21/6433* | (2011.01) | |
| *H04N 21/81* | (2011.01) | |
| *H04N 21/84* | (2011.01) | |

(52) U.S. Cl.
CPC ....... *H04N13/0059* (2013.01); *H04N 13/0066* (2013.01); *H04N 13/0497* (2013.01); *H04N 21/2362* (2013.01); *H04N 21/23614* (2013.01); *H04N 21/4345* (2013.01); *H04N 21/4348* (2013.01); *H04N 21/4884* (2013.01); *H04N 21/6433* (2013.01); *H04N 21/816* (2013.01); *H04N 21/84* (2013.01)

(56) References Cited

U.S. PATENT DOCUMENTS

| | | | |
|---|---|---|---|
| 2009/0244268 A1* | 10/2009 | Masuda et al. | 348/51 |
| 2009/0324202 A1* | 12/2009 | Okubo et al. | 386/95 |
| 2010/0021141 A1 | 1/2010 | Yamashita et al. | |
| 2010/0103168 A1 | 4/2010 | Jung et al. | |
| 2010/0157025 A1* | 6/2010 | Suh et al. | 348/51 |
| 2010/0238267 A1 | 9/2010 | Izzat et al. | |
| 2010/0269065 A1* | 10/2010 | Uchimura | 715/810 |
| 2011/0141234 A1 | 6/2011 | Tsukagoshi | |
| 2014/0176675 A1 | 6/2014 | Nagasawa et al. | |

FOREIGN PATENT DOCUMENTS

| | | | |
|---|---|---|---|
| EP | 2293585 | A1 | 3/2011 |
| JP | 2004-201004 | A | 7/2004 |
| JP | 2009-135686 | A | 6/2009 |
| JP | 2011-029849 | A | 2/2011 |
| JP | 2011-30176 | A | 2/2011 |
| JP | 2011-030192 | A | 2/2011 |
| KR | 10-2008-0004755 | A | 1/2008 |
| KR | 10-2009-0004722 | A | 1/2009 |
| KR | 10-2010-0002031 | A | 1/2010 |
| WO | 2005114998 | A1 | 12/2005 |
| WO | 2008115222 | A1 | 9/2008 |
| WO | 2009-157198 | A1 | 12/2009 |
| WO | 2010010499 | A1 | 1/2010 |
| WO | 2011056803 | A2 | 5/2011 |

OTHER PUBLICATIONS

Written Opinion for PCT/KR2011/002668 dated Oct. 21,2011 [PCT/ISA/237].

Communication dated Nov. 20, 2013 issued by the European Patent Office in counterpart European Patent Application No. 11769097.4.

Yano et al., "Two Factors in Visual Fatigue Caused by Stereoscopic HDTV images," Displays Devices, Elesevier B.V., vol. 25, No. 4, Nov. 1, 2004, pp. 141-150.

Communication dated Feb. 24, 2015, issued by the Japanese Patent Office in counterpart application No. 2013-504834.

Communication dated Mar. 11, 2015, issued by the State Intellectual Property Office of P.R. China in counterpart application no. 201180029524.8.

Communication issued Aug. 25, 2015, issued by the Japanese Patent Office in counterpart Japanese Patent Application No. 2013-504834.

Dolan, M., et al., Digital Television (DTV) Closed Captioning: 3D Extensions, Consumer Electronics Association, 11 pages total.

* cited by examiner

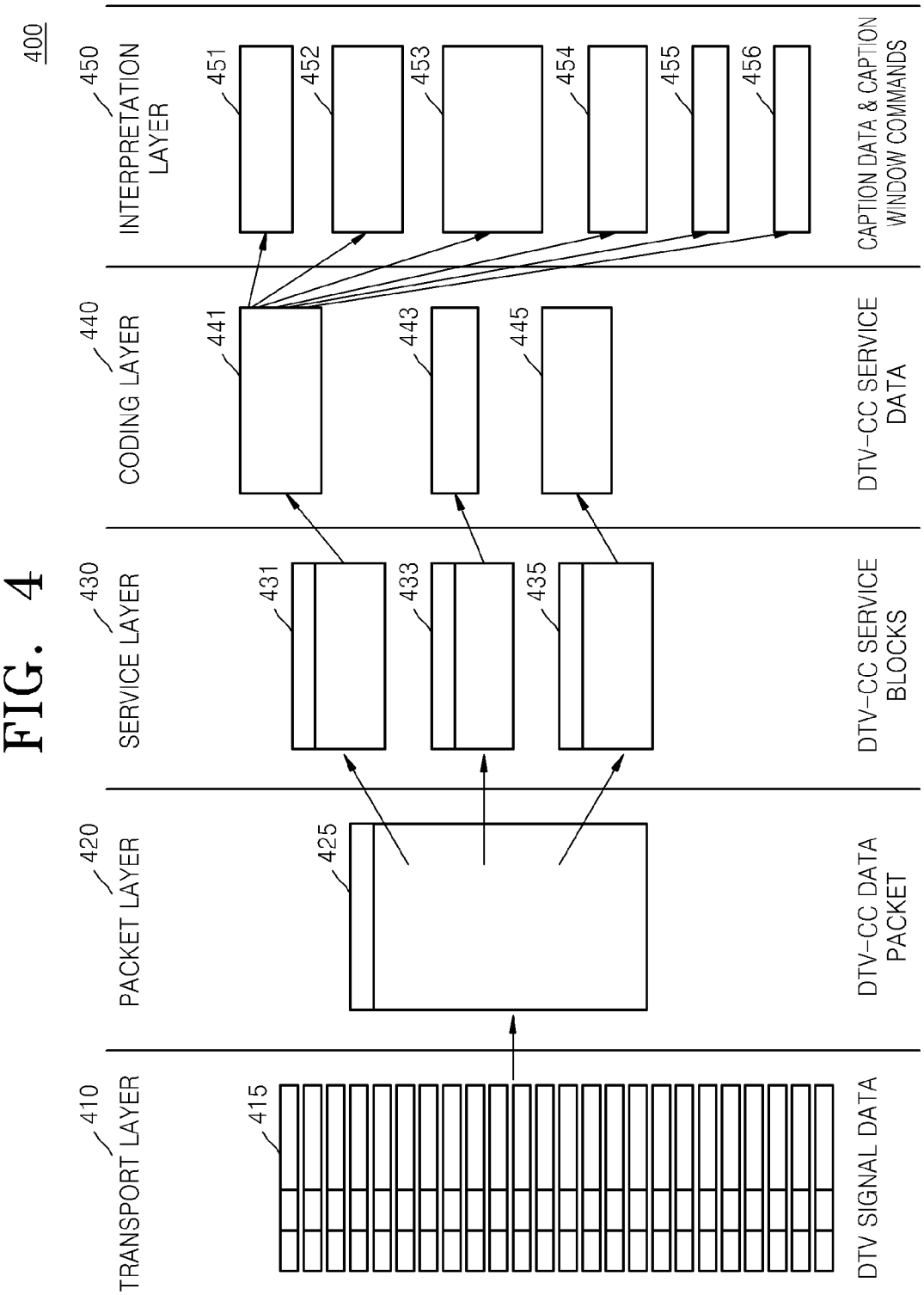

FIG. 5

| | | C | 0 | | | G | 0 | | | C | 1 | | | G | 1 | | |
|---|---|---|---|---|---|---|---|---|---|---|---|---|---|---|---|---|---|
| b7-b4 | | 0 | 1 | 2 | 3 | 4 | 5 | 6 | 7 | 8 | 9 | A | B | C | D | E | F |
| b3-b0 | 0 | NUL | EX11 | SP | 0 | @ | P | ` | p | CW0 | SPA | NBS | ° | À | Ð | à | ð |
| | 1 | | | ! | 1 | A | Q | a | q | CW1 | SPC | ¡ | ± | Á | Ñ | á | ñ |
| | 2 | | | " | 2 | B | R | b | r | CW2 | SPL | ¢ | ² | Â | Ò | â | ò |
| | 3 | FIX | | # | 3 | C | S | c | s | CW3 | | £ | ³ | Ã | Ó | ã | ó |
| | 4 | | | $ | 4 | D | T | d | t | CW4 | | ¤ | ´ | Ä | Ô | ä | ô |
| | 5 | | | % | 5 | E | U | e | u | CW5 | | ¥ | µ | Å | Õ | å | õ |
| | 6 | | | & | 6 | F | V | f | v | CW6 | | ¦ | ¶ | Æ | Ö | æ | ö |
| | 7 | | | ' | 7 | G | W | g | w | CW7 | SWA | § | · | Ç | × | ç | ÷ |
| | 8 | BS | PI6 | ( | 8 | H | X | h | x | CLW | D=0 | ¨ | ¸ | È | Ø | è | ø |
| | 9 | | | ) | 9 | I | Y | i | y | DSW | D=1 | © | ¹ | É | Ù | é | ù |
| | A | | | * | : | J | Z | j | z | HDW | D=2 | ª | º | Ê | Ú | ê | ú |
| | B | | | + | ; | K | [ | k | { | TGW | D=3 | « | » | Ë | Û | ë | û |
| | C | FF | | , | < | L | W | l | \| | DLW | D=4 | ¬ | ¼ | Ì | Ü | ì | ü |
| | D | CR | | - | = | M | ] | m | } | DLY | D=5 | - | ½ | Í | Ý | í | ý |
| | E | HCR | | . | > | N | ^ | n | ~ | CLC | D=6 | ® | ¾ | Î | Þ | î | þ |
| | F | | | / | ? | O | _ | o | ♪ | RST | D=7 | ¯ | ¿ | Ï | ß | ï | ÿ |
| | 0 | | | TSP | • | | | | | | | CC | | | | | |
| | 1 | | | NBTSP | ' | | | | | | | | | | | | |
| | 2 | | | | ' | | | | | | | | | | | | |
| | 3 | | | | " | | | | | | | | | | | | |
| | 4 | | | | " | | | | | | | | | | | | |
| | 5 | | | … | ● | | | | | | | | | | | | |
| | 6 | | | | | | | ⅛ | | | | | | | | | |
| | 7 | | | | | | | ⅜ | | | | | | | | | |
| | 8 | | | | | | | ⅝ | | | | | | | | | |
| | 9 | | | | ™ | | | ⅞ | | | | | | | | | |
| | A | | | Š | š | | | │ | | | | | | | | | |
| | B | | | | | | | ┐ | | | | | | | | | |
| | C | | | Œ | œ | | | └ | | | | | | | | | |
| | D | | | | SM | | | ─ | | | | | | | | | |
| | E | | | | | | | ┘ | | | | | | | | | |
| | F | | | | Ÿ | | | ┌ | | | | | | | | | |
| | | C | 2 | | | G | 2 | | | C | 3 | | | G | 3 | | |

510, 550, 520, 560, 535, 530, 570, 540, 580

```
                    Syntax
    caption_service_descriptor () {
        descriptor_tag
        descriptor_length
650 ——— reserved
        number_of_services
        for (i=0;i<number_of_services;i++) {
610 ———     language
620 ———     cc_type
            reserved
            if (cc_type==line21) {
660 ———         reserved
                line21_field
            }
            else
                caption_service_number
            easy_reader
            wide_aspect_ratio
            korean_code
670 ———     reservd
        }
    }
```

FIG. 10
| b7 | b6 | b5 | b4 | b3 | b2 | b1 | b0 | |
|---|---|---|---|---|---|---|---|---|
| 0 | 0 | 0 | 0 | 1 | 0 | 0 | 0 | Command code |
| bos | bof6 | bof5 | bof4 | bof3 | bof2 | bof1 | bof0 | param |
FIG. 11
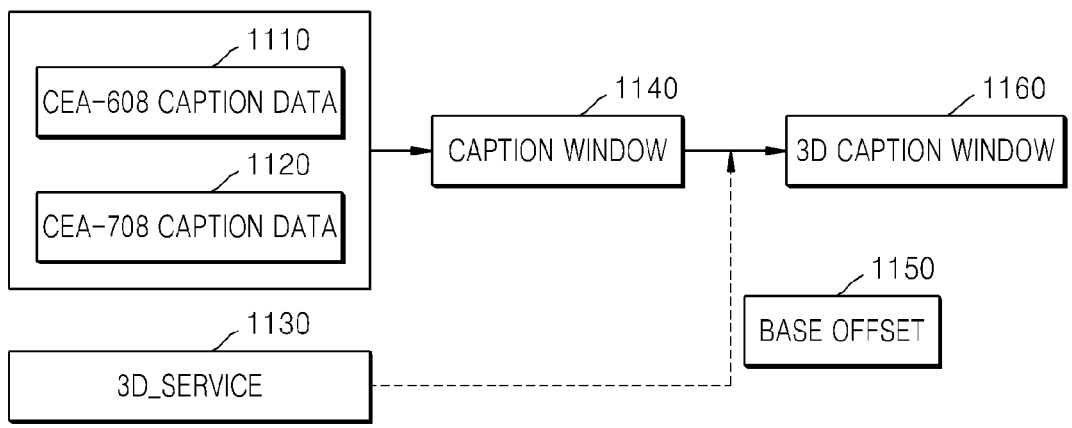
FIG. 12
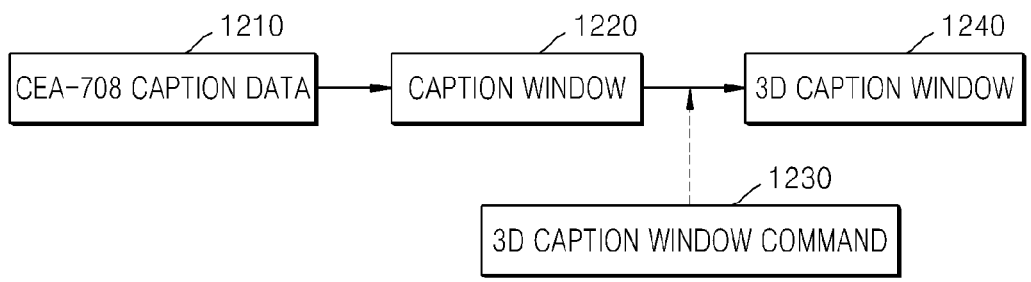

| b7 | b6 | b5 | b4 | b3 | b2 | b1 | b0 | |
|---|---|---|---|---|---|---|---|---|
| 0 | 0 | 0 | 1 | 0 | 0 | 1 | 0 | Command code |
| id2 | id1 | id0 | st3 | st2 | st1 | st0 | Target disparity sign | param1 |
| dis7 | dis6 | dis5 | dis4 | dis3 | dis2 | dis1 | dis0 | param2 |

FIG. 20

| b7 | b6 | b5 | b4 | b3 | b2 | b1 | b0 | |
|---|---|---|---|---|---|---|---|---|
| 0 | 0 | 0 | 1 | 0 | 0 | 0 | 1 | Command code |
| id2 | id1 | id0 | sf12 | sf11 | sf10 | sf9 | sf8 | param1 |
| sf7 | sf6 | sf5 | sf4 | sf3 | sf2 | sf1 | sf0 | param2 |

FIG. 21

| b7 | b6 | b5 | b4 | b3 | b2 | b1 | b0 | |
|---|---|---|---|---|---|---|---|---|
| 0 | 0 | 0 | 1 | 0 | 0 | 1 | 0 | Command code |
| id2 | id1 | id0 | st3 | st2 | st1 | st0 | Target disparity sign | param1 |
| dis7 | dis6 | dis5 | dis4 | dis3 | dis2 | dis1 | dis0 | param2 |
| sf7 | sf6 | sf5 | sf4 | sf3 | sf2 | sf1 | sf0 | param3 |

METHOD AND APPARATUS FOR GENERATING A BROADCAST BIT STREAM FOR DIGITAL BROADCASTING WITH CAPTIONS, AND METHOD AND APPARATUS FOR RECEIVING A BROADCAST BIT STREAM FOR DIGITAL BROADCASTING WITH CAPTIONS

CROSS-REFERENCE TO RELATED APPLICATIONS

This application is a national stage entry of International Application No. PCT/KR2011/002668, filed on Apr. 14, 2011, and claims the benefit of U.S. Provisional Application No. 61/324,011, filed on Apr. 14, 2010 in the United States Patent and Trademark Office, and U.S. Provisional Application No. 61/353,725, filed on Jun. 11, 2010 in the United States Patent and Trademark Office, the disclosures of which are incorporated herein by reference in their entireties.

BACKGROUND

1. Field

The present invention relates to methods and apparatuses for sending and receiving digital broadcasting content to provide two-dimensional (2D) or three-dimensional (3D) content.

2. Description of Related Art

Digital broadcast transport systems may provide a caption service for generating captions to be displayed on a video screen while providing video content and audio content via a broadcast program. Digital broadcast receiving systems may reproduce a video screen on which captions are displayed by decoding received video data to reconstruct video content and combining the captions generated by using caption data received via the caption service.

Requirements for 3D content accompanied by a sense of reality and a 3D effect have increased. Further, content or programs for broadcasts prepared to be reproduced in 3D have appeared. Digital broadcast receiving systems which support 3D video are able to reproduce a 3D video by receiving content for a 3D broadcast. Based on changes in methods of reproducing broadcasting content due to supply of 3D video broadcasting content, additional functions of the digital broadcast receiving systems also require changes.

SUMMARY One or more exemplary embodiments provide a method or providing 3D caption information for realizing a 3D caption by using 2D caption data obtained from a digital broadcasting stream, thereby realizing the 3D caption by using the 3D caption information.

According to an aspect of an exemplary embodiment, there is provided a method for generating a broadcasting bitstream for a digital caption broadcast, the method including: receiving video data in which a video including at least one of a 2D video and a 3D video is encoded; determining caption data for reproduction in conjunction with the video, and 3D caption converting information including information relating to a converting speed of an offset for reproducing the caption data as a 3D caption; and outputting a bitstream for a digital broadcast by multiplexing the received video data, the determined caption data, and the determined 3D caption converting information.

The outputting the bitstream includes: inserting the caption data into at least one of a user data region of the digital broadcasting bitstream, a caption service data region, and a section table region; and inserting the 3D caption converting information into at least one of a caption service block of the bitstream, a caption window command, and the section table region.

According to an aspect of another exemplary embodiment, there is provided a method for receiving a broadcasting bitstream for a digital caption broadcast is provided, the method including: receiving a bitstream comprising encoded video data which includes at least one of a 2D video and a 3D video; extracting the encoded video data, caption data for reproduction in conjunction with a video, and 3D caption converting information comprising information relating to a converting speed of an offset for reproducing the caption data as a 3D caption from the bitstream by de-multiplexing and parsing the received bitstream; and determining a reproducing form of the caption data relating to displaying the reproduced caption data as a 3D caption on a video screen, based on the extracted 3D caption converting information.

The method may further include: reconstructing a video which includes at least one of the 2D video and the 3D video by decoding the encoded video data; and reproducing the caption data and displaying the reproduced caption data as a 3D caption on the video screen based on the determined reproducing form of the caption data.

According to an aspect of another exemplary embodiment, there is provided an apparatus for generating a broadcasting bitstream for a digital caption broadcast, the apparatus including: a video data receiver for receiving video data in which a video including at least one of a 2D video and a 3D video is encoded by a video encoding processor; a 3D caption converting information determiner for determining caption data for reproduction in conjunction with the video, and 3D caption converting information including information relating to a converting speed of an offset for reproducing the caption data as a 3D caption; and a bitstream output unit for outputting a bitstream for a digital broadcast by multiplexing the received video data, the determined caption data, and the determined 3D caption converting information.

According to an aspect of another exemplary embodiment, there is provided an apparatus for receiving a broadcasting bitstream for a digital caption broadcast, the apparatus including: a bitstream receiver for receiving a bitstream including encoded video data which includes at least one of a 2-dimensional (2D) video and a 3D video; an extractor for extracting the encoded video data, caption data for reproduction in conjunction with a video, and 3D caption converting information including information relating to a converting speed of an offset for reproducing the caption data as a 3D caption from the bitstream by de-multiplexing and parsing the received bitstream; and a caption determiner for determining a reproducing form of the caption data relating to displaying the reproduced caption data as a 3D caption on a video screen, based on the extracted 3D caption converting information.

The apparatus may further include: a video reconstructor which reconstructs at least one video from among the 2D video and the 3D video by decoding the encoded video data by interlocking with a video decoding processor; and a reproducer which reproduces the caption data as a 3D caption and displays the 3D caption on the video screen based on the determined reproducing form of the caption data.

According to an aspect of another exemplary embodiment, there is provided non-transitory computer-readable recording medium having recorded thereon program for executing the methods for generating a digital broadcasting bitstream by using an operation processor.

According to a digital broadcasting bitstream generated according to at least one exemplary embodiment, 3D caption converting information, 3D caption offset information, caption offset converting speed information, 3D caption size converting information, and 3D caption transport information according to an exemplary embodiment may be transmitted and received by using at least one of a service block of a bitstream, a caption window command, and a space in a section table region.

Further, a 3D broadcast program having a visually natural appearance to a television (TV) viewer may be provided because a 2D caption reproducing state and a 3D caption reproducing state are prevented from being rapidly changed, a caption size may be changed in proportion to a change of a caption depth, and a reproduction order may be set by assigning a 3D caption priority between a plurality of caption windows that overlap each other.

BRIEF DESCRIPTION OF THE DRAWINGS

The above and/or other aspects of the disclosure will become apparent and more readily appreciated from the following description of exemplary embodiments, taken in conjunction with the accompanying drawings of which:

FIG. 4 illustrates a protocol model of a caption channel;

FIG. 5 illustrates a DTV-CC code set table according to CEA-708;

FIG. 10 illustrates a 3D caption offset command according to an exemplary embodiment;

FIGS. 11 and 12 respectively illustrate a 3D caption service block according to an exemplary embodiment and an exemplary embodiment of determining a 3D caption window by using a 3D caption offset command according to an exemplary embodiment;

FIG. 20 illustrates a 3D caption size converting command according to an exemplary embodiment;

FIG. 21 illustrates a caption offset converting speed command for additionally setting 3D caption size converting information, according to an exemplary embodiment;

DETAILED DESCRIPTION

Hereinafter, a method and apparatus for generating a digital broadcasting bitstream including caption information for reproducing a 3-dimensional (3D) caption according to an exemplary embodiment for a digital broadcast providing a 2D video or a 3D video, and a method and apparatus for receiving a digital broadcasting bitstream will be described with reference to FIGS. 1 through 26. Further, a method and apparatus for reproducing a 3D caption by using caption information according to an exemplary embodiment will be described.

Figure 1:
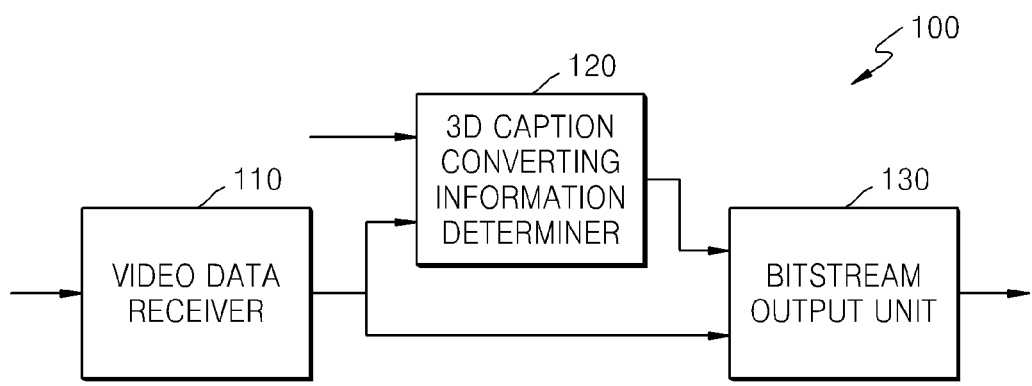
FIG. 1 is a bock diagram of an apparatus for generating a digital broadcasting bitstream for a digital caption broadcast, according to an exemplary embodiment.

FIG. 1 is a block diagram of an apparatus 100 for generating a digital broadcasting bitstream for a digital caption broadcast, according to an exemplary embodiment.

The apparatus 100 according to an exemplary embodiment includes a video data receiver 110, a 3D caption converting information determiner 120, and a bitstream output unit 130.

The apparatus 100 according to an exemplary embodiment generates a bitstream including video data, caption data, and 3D caption converting information according to an exemplary embodiment, which includes various pieces of information required to smoothly reproduce the caption data as a 3D caption. The apparatus 100 according to an exemplary embodiment may alternatively generate a bitstream for a terrestrial digital television (DTV) broadcasting system according to the Advanced Television Systems Committee (ATSC) standard.

The video data receiver 110 according to an exemplary embodiment receives video data, in which a video is encoded, from a video encoding processor. The apparatus 100 according to an exemplary embodiment receives video data, in which a video including at least one of a 2D video and a 3D video is encoded, so as to provide a 2D video broadcasting service or a 3D video broadcasting service.

The 3D caption converting information determiner 120 according to an exemplary embodiment determines the caption data to be reproduced in conjunction with the video data, and the 3D caption converting information which includes information relating to reproducing the caption data as a 3D caption. The 3D caption converting information according to an exemplary embodiment may include information relating to a converting speed of an offset for reproducing the caption data as a 3D caption.

The 3D caption converting information determiner 120 according to an exemplary embodiment may determine digital television closed caption (DTV-CC) data according to CEA-608 or CEA-708.

The bitstream output unit 130 according to an exemplary embodiment receives and multiplexes the video data output from the video data receiver 110, and the caption data and the 3D caption converting information output from the 3D caption converting information determiner 120, in order to output a bitstream.

The bitstream output unit 130 according to an exemplary embodiment may form a bitstream including the video data, the caption data, and the 3D caption converting information based on the MPEG-2 Transport Stream (TS)-based system.

The video data may be transported by being inserted into a picture data region of a video stream of a digital broadcasting bitstream. The caption data may be transmitted by being included in at least one of a user data region, a caption service data region, and a section table region of the video stream.

The bitstream output unit 130 according to an exemplary embodiment may insert the 3D caption converting information into at least one of a caption service block, a caption window command, and a section table region of a bitstream.

The bitstream output unit 130 according to an exemplary embodiment may multiplex the bitstream to transmit the bitstream in a form of a transport stream.

Hereinafter, a method which is executable by the 3D caption converting information determiner 120 for determining the 3D caption converting information according to an exemplary embodiment, and a method which is executable by the bitstream output unit 130 for transmitting the 3D caption converting information according to an exemplary embodiment will be described.

The 3D caption converting information determiner 120 according to an exemplary embodiment may determine at least one of 3D caption offset information, caption offset converting speed information, 3D caption size converting information, and 3D caption transport information which includes a notification that the 3D caption converting information is transmitted as the 3D caption converting information.

The 3D caption offset information according to an exemplary embodiment indicates a caption offset required for reproducing the caption data as a 3D caption, and the caption offset may indicate respective offsets of a main view caption window and a sub view caption window. The offsets of the main view caption window and the sub view caption window according to an exemplary embodiment may include at least one of a depth, a disparity, and a binocular parallax between the main view caption window and the sub view caption window. Alternatively, the respective offsets of the main view caption window and the sub view caption window may include at least one of a depth, a disparity, and a binocular parallax from a zero-plane to a main view caption or a sub view caption.

The bitstream output unit 130 according to an exemplary embodiment may generate a 3D caption service block which includes the 3D caption offset information, and insert the 3D caption service block into the user data region of the video stream of the digital broadcasting bitstream. The bitstream output unit 130 according to an exemplary embodiment transmits the bitstream which includes the caption service block and the 3D caption service bock, and thus, may transmit the 3D caption offset information in conjunction with the caption data included in a current caption service block.

The bitstream output unit 130 according to an exemplary embodiment may determine a 3D caption offset command for setting the 3D caption offset information, based on a format of the caption window command. The 3D caption offset command according to an exemplary embodiment may designate the 3D caption offset information for each of a plurality of caption services.

The bitstream output unit 130 according to an exemplary embodiment may insert the caption window command based on CEA-708 into the caption service data region of the bitstream. The caption service data region may be included in the caption service block. As described above, because the caption service data region is a component of the user data region of the video stream of the digital broadcasting bitstream, the 3D caption offset command according to an exemplary embodiment may be inserted into the caption service data region of the video stream of the digital broadcasting bitstream. Accordingly, the 3D caption offset command according to an exemplary embodiment may be transported in conjunction with the caption data in the caption service block.

The bitstream output unit 130 according to an exemplary embodiment may insert the 3D caption offset information into a reserved region of a caption service descriptor in at least one table region from among a program map table (PMT) region and an event information table (EIT) region of the section table region. Alternatively, the bitstream output unit 130 according to an exemplary embodiment may generate a descriptor which includes the 3D caption offset information and insert the generated descriptor into a descriptor region of at least one of the PMT region or the EIT region of the section table region. The bitstream output unit 130 according to an exemplary embodiment generates a bitstream by multiplexing a section table and the video stream and transmits the generated bitstream so that the 3D caption offset information is transmitted in conjunction with the video data of the video stream, the section table, or the caption data included in the video stream.

The caption offset converting speed information according to an exemplary embodiment may include target offset information indicating a target offset of a 3D caption window and caption converting section information indicating a section within which a caption offset is converted, so as to prevent a rapid conversion of a caption offset of a 3D caption.

The bitstream output unit 130 according to an exemplary embodiment may determine a caption offset converting speed command for setting the caption offset converting speed information, based on the format of the caption window command. The caption offset converting speed command according to an exemplary embodiment may set the caption offset converting speed information for each of a plurality of caption windows of a current caption service.

The bitstream output unit 130 according to an exemplary embodiment transmits the bitstream by inserting the caption offset converting speed command into the caption service data region of the video stream of the digital broadcasting bitstream, and thus, the caption offset converting speed information may be transmitted in conjunction with the caption data of the current caption service block.

The caption offset converting speed information according to an exemplary embodiment may include at least one of information indicating an offset variation between caption windows of a current frame and a following frame, information indicating a direction of the offset variation, target offset information, and caption converting window identification information indicating a caption window within which a caption conversion occurs.

The information relating to the offset variation for a 3D caption, according to an exemplary embodiment, may indicate a difference between respective offsets of the current frame and the following frame. The caption converting section information for a 3D caption, according to an exemplary embodiment, may indicate a number of frames from a frame at which the caption conversion is started to a frame at which the caption conversion is completed.

The 3D caption converting information determiner 120 according to an exemplary embodiment may determine the 3D caption size converting information including information for adjusting a size of a 3D caption, so as to reproduce the caption data after converting a caption offset. The 3D caption size converting information according to an exemplary embodiment may indicate a ratio for changing the size of the 3D caption. The size of the 3D caption according to an exemplary embodiment may include at least one of a size of a caption window and a size of a caption font.

The bitstream output unit 130 according to an exemplary embodiment may determine a 3D caption size converting command for setting the 3D caption size converting information, based on the format of the caption window command. The 3D caption size converting command according to an exemplary embodiment may set the 3D caption size converting information for each of a plurality of caption windows of the current caption service.

The bitstream output unit 130 according to an exemplary embodiment transmits the bitstream by inserting the 3D caption size converting command into the caption service data region of the video stream of the digital broadcasting bitstream, and thus, the 3D caption size converting information may be transmitted in conjunction with the caption data of the current caption service block.

The bitstream output unit 130 according to an exemplary embodiment may modify the caption offset converting speed command according to an exemplary embodiment such that the caption offset converting speed command further sets the 3D caption size converting information.

The bitstream output unit 130 according to an exemplary embodiment may insert the 3D caption transport information indicating that the 3D caption converting information is transmitted via the bitstream into the caption service descriptor in at least one table region from among the PMT region and the EIT region of the section table region.

In particular, the 3D caption transport information according to an exemplary embodiment may indicate whether at least one of the 3D caption offset information, the caption offset converting speed information, and the 3D caption size converting information is transmitted via the bitstream.

The bitstream output unit 130 according to an exemplary embodiment may generate a 3D caption transport descriptor which includes the 3D caption transport information indicating that at least one of the 3D caption converting information and the caption data is transmitted, and insert the 3D caption transport descriptor into a descriptor region of at least one table region of the PMT region and the EIT region.

Alternatively, the bitstream output unit 130 according to an exemplary embodiment may insert and transmit at least one of 3D caption service block transport information indicating that the 3D caption service block is transmitted and 3D caption window command transport information indicating that the 3D caption window command is transmitted into the caption service descriptor of at least one table region of the PMT region and the EIT region.

When two video elementary streams are transmitted, the bitstream output unit 130 according to an exemplary embodiment may insert main view video data and sub view video data relating to a 3D video into a main video elementary stream and a sub-video elementary stream, respectively. The bitstream output unit 130 according to an exemplary embodiment may insert the 3D caption converting information and the 3D caption transport information according to an exemplary embodiment into at least one of the main video elementary stream and the sub-video elementary stream.

In particular, when the main view video data and the sub view video data relating to the 3D video are respectively inserted into the main video elementary stream and the sub-video elementary stream, the bitstream output unit 130 according to an exemplary embodiment may insert the 3D caption converting information and the 3D caption transport information into the sub-video elementary stream for a 2D caption system that does not support a 3D caption.

Figure 2A:
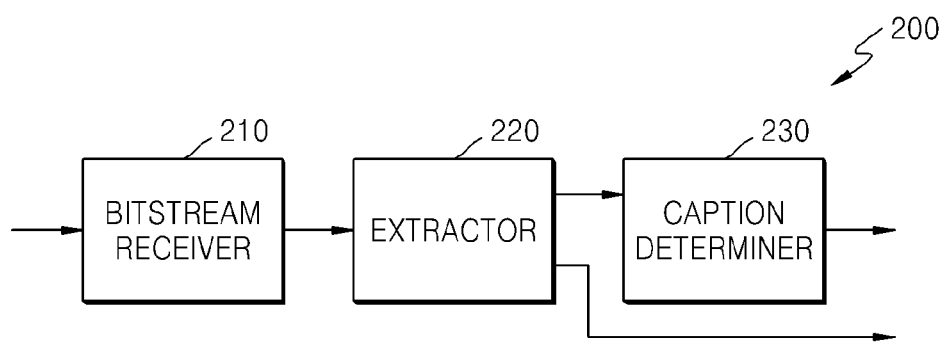
FIGS. 2A and 2B are block diagrams of apparatuses for receiving a digital broadcasting bitstream for a digital caption broadcast, according to exemplary embodiments.
Figure 2B:
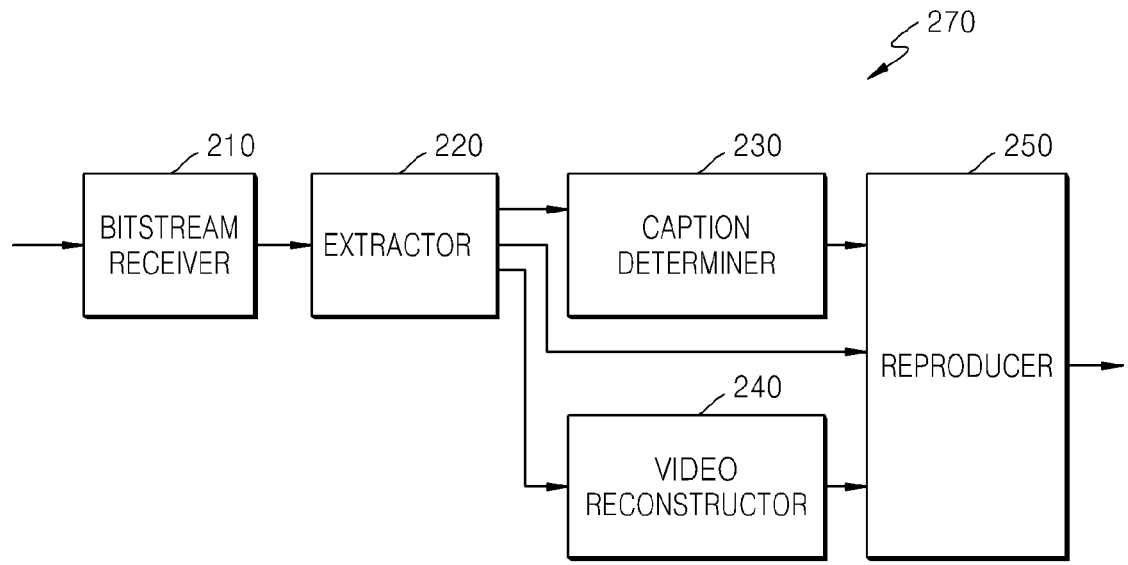

FIGS. 2A and 2B are block diagrams of apparatuses 200 and 270 for receiving a digital broadcasting bitstream for a digital caption broadcast, according to exemplary embodiments.

Each of the apparatuses 200 and 270 for receiving a digital broadcasting bitstream which includes caption information relating to a digital caption broadcast, according to an exemplary embodiment, includes a bitstream receiver 210, an extractor 220, and a caption determiner 230.

Each of the apparatuses 200 and 270 according to an exemplary embodiment receives a bitstream which includes video data, caption data, and 3D caption converting information according to an exemplary embodiment, which includes various pieces of information required to smoothly reproduce the caption data as a 3D caption. Each of the apparatuses 200 and 270 according to an exemplary embodiment may alternatively receive a bitstream for a terrestrial DTV broadcasting system according to an ATSC method.

The bitstream receiver 210 according to an exemplary embodiment receives a bitstream which includes encoded video data relating to at least one of a 2D video and a 3D video. The bitstream receiver 210 according to an exemplary embodiment may receive a bitstream in a form of a transport stream.

The extractor 220 according to an exemplary embodiment de-multiplexes and parses the received bitstream, and extracts the encoded video data, the caption data to be reproduced in conjunction with a video, and the 3D caption converting information from the bitstream. The 3D caption converting information according to an exemplary embodiment may correspond to the 3D caption converting information determined by the apparatus 100 described above with reference to FIG. 1.

The extractor 220 according to an exemplary embodiment may extract the caption data from at least one of a user data region, a caption service data region, and a section table region of a digital broadcasting bitstream.

The extractor 220 according to an exemplary embodiment may extract the 3D caption converting information from at least one of a caption service block, a caption window command, and the section table region of the bitstream. The extractor 220 according to an exemplary embodiment may extract least one of 3D caption offset information, caption offset converting speed information, 3D caption size converting information, and 3D caption transport information indicating that the 3D caption converting information is transmitted, as the 3D caption converting information.

The caption determiner 230 according to an exemplary embodiment determines a reproducing form of a 3D caption relating to displaying the 3D caption on a video screen, based on the 3D caption converting information extracted by the extractor 220. The caption determiner 230 according to an exemplary embodiment may determine a 3D caption by reconstructing a character, an icon, and/or any other relevant type of entity which is usable in a caption by using the caption data extracted from the bitstream.

In addition, the apparatus 270 according to an exemplary embodiment may further include a video reconstructor 240 and a reproducer 250, together with the bitstream receiver 210, the extractor 220, and the caption determiner 230 of the apparatus 270 according to an exemplary embodiment. Because the apparatus 270 includes all components of the apparatus 200, the apparatus 270 may perform all operations of the apparatus 200.

The video reconstructor 240 according to an exemplary embodiment receives the encoded video data extracted by the extractor 220, decodes the encoded video data by co-operating with a video decoding processor, and may reconstruct at least one video from among the 2D video and the 3D video. In the 3D video, a main view video and at least one sub view video may be reconstructed.

The reproducer 250 according to an exemplary embodiment receives the video reconstructed by the video reconstructor 240 and the caption data extracted by the extractor 220, and may reproduce a 3D caption on a video screen by combining the reconstructed video and the caption data based on the reproducing form determined by the caption determiner 230.

The reproducing form according to an exemplary embodiment may include a location and a size of a caption window, a size of a caption font, and a 3D caption priority of a caption. An operation of determining the location and size of the caption window may include an operation of determining respective locations and respective sizes of a main view caption window and a sub view caption window.

The caption determiner 230 according to an exemplary embodiment may determine the location and the size of the caption window and the size of the caption font based on the 3D caption converting information.

The reproducer 250 according to an exemplary embodiment may reproduce a main view screen on which a main view caption and a main view video are combined, and a sub view screen on which a sub view caption and a sub view video are combined, by combining the main view video and the sub view video of the reconstructed video respectively with the main view caption and the sub view caption.

The extractor 220 according to an exemplary embodiment may extract a 3D caption service block from the user data region of the video stream of the digital broadcasting bitstream. The extractor 220 according to an exemplary embodiment may extract the 3D caption offset information from the 3D caption service block.

The extractor 220 according to an exemplary embodiment may extract a 3D caption offset command from the caption service data region of the bitstream. The caption determiner 230 according to an exemplary embodiment may read the 3D caption offset information for each of a plurality of caption services, based on the 3D caption offset command.

Further, the extractor 220 according to an exemplary embodiment may extract the 3D caption offset information from a reserved region of a caption service descriptor in at least one table region from among a PMT region and an EIT region of the section table region. Alternatively, the extractor 220 according to an exemplary embodiment may extract a descriptor which includes the 3D caption offset information from at least one descriptor region from among the PMT region and the EIT region of the section table region, and extract the 3D caption offset information from the descriptor.

The caption determiner 230 according to an exemplary embodiment may read an offset of a 3D caption window, and determine the respective locations of the main view caption window and the sub view caption window, based on the 3D caption offset information according to an exemplary embodiment extracted by the extractor 220. The caption determiner 230 according to an exemplary embodiment may read at least one of a depth, a disparity, and a binocular parallax between the main view caption window and the sub view caption window, or at least one of a depth, a disparity, and a binocular parallax between a zero-plane to a main view caption or a sub view caption, as the offset of the 3D caption window.

The extractor 220 according to an exemplary embodiment may extract caption offset converting speed information which includes target offset information and caption converting section information from the caption service data region of the bitstream.

The caption determiner 230 according to an exemplary embodiment may determine an offset of the caption window for each of a plurality of frames based on the caption offset converting speed information, and determine the respective locations of the main view caption window and the sub view caption window.

The extractor 220 according to an exemplary embodiment may extract a caption offset converting speed command from the caption service data region of the video stream of the digital broadcasting bitstream. The caption determiner 230 according to an exemplary embodiment may read the caption offset converting speed information based on the caption offset converting speed command.

The extractor 220 according to an exemplary embodiment may extract at least one of information indicating an offset variation between caption windows of a current frame and a following frame, information indicating a direction of the offset variation, target offset information, and caption converting window identification information indicating a caption window within which a caption conversion occurs from the caption offset converting speed information.

The caption determiner 230 which determines the reproducing form of the caption data according to an exemplary embodiment may determine respective offsets for each of a plurality of frames by determining a difference between the offsets of the current frame and the following frame, based on the information indicating the offset variation. Further, the caption determiner 230 according to an exemplary embodiment may determine a number of frames from a frame at which a caption conversion is started to a frame at which the caption conversion is completed, based on the caption converting section information. The caption determiner 230 according to an exemplary embodiment may determine the offset of the caption window for each of a plurality of frames based on the target offset and the number of frames. Further, the caption determiner 230 according to an exemplary embodiment may determine the respective locations of the main view caption window and the sub view caption window based on the determined offset of the caption window for each of the plurality of frames.

The extractor 220 according to an exemplary embodiment may extract the 3D caption size converting information from the caption service data region of the bitstream.

The caption determiner 230 according to an exemplary embodiment may determine a size of a 3D caption based on the 3D caption size converting information. The determining of the size may include at least one of determining of a size of the caption window and determining of a font size of the 3D caption. In particular, the caption determiner 230 according to an exemplary embodiment may read a ratio of changing a size of the caption data based on the 3D caption size converting information, and determine the size of the 3D caption based on the read ratio.

The extractor 220 according to an exemplary embodiment may extract a 3D caption size converting command from the caption service data region of the video stream of the digital broadcasting bitstream. In particular, the caption determiner 230 according to an exemplary embodiment may read the 3D caption size converting information based on the 3D caption size converting command, and determine the size of the 3D caption based on the 3D caption size converting information.

The extractor 220 according to an exemplary embodiment may read the 3D caption size converting information from a caption offset converting speed command according to an exemplary embodiment, and determine the size of the 3D caption based on the 3D caption size converting information.

The extractor 220 according to an exemplary embodiment may extract the 3D caption transport information indicating that the 3D caption converting information is transmitted via the bitstream, from the caption service descriptor in at least one table region from among the PMT region and the EIT region of the section table region.

The extractor 220 according to an exemplary embodiment determines that the 3D caption converting information is inserted into the received bitstream, based on the 3D caption transport information. Accordingly, the extractor 220 according to an exemplary embodiment determines that the 3D caption offset information, the caption offset converting speed information, and the 3D caption size converting information are inserted into the bitstream and extracts corresponding information, based on the 3D caption transport information.

Further, the extractor 220 according to an exemplary embodiment may extract the 3D caption transport information indicating that the 3D caption information is transmitted from the descriptor region of at least one table region from among the PMT region and the EIT region of the section table region.

The extractor 220 according to an exemplary embodiment may extract 3D caption service transport information indicating that the 3D caption service block is transmitted from at least one table region from among the PMT region and the EIT region of the section table region.

Further, the extractor 220 according to an exemplary embodiment may extract 3D caption window command transport information indicating that the 3D caption window command is transmitted from at least one table region from among the PMT region and the EIT region of the section table region.

When it is determined that the 3D caption converting information is included in the bitstream based on the 3D caption transport information, the extractor 220 according to an exemplary embodiment may extract the 3D caption converting information from at least one of the caption service block, the caption window command, and the section table region.

The extractor 220 according to an exemplary embodiment may extract main view video data and sub view video data in the 3D video respectively from the main elementary stream and the sub elementary stream of the bitstream.

The extractor 220 according to an exemplary embodiment may extract the 3D caption transport information from at least one of the main elementary stream and the sub elementary stream, determine an elementary stream including the 3D caption converting information based on the 3D caption transport information, and extract the 3D caption converting information from the determined elementary stream.

Alternatively, the extractor 220 according to an exemplary embodiment may extract the 3D caption transport information only from the sub elementary stream. When it is read that the 3D caption converting information is included in the sub elementary stream based on the 3D caption transport information according to an exemplary embodiment, the 3D caption converting information may be extracted from the sub elementary stream. Conversely, when it is read that the 3D caption converting information is not included in the sub elementary stream based on the 3D caption transport information according to an exemplary embodiment, the 3D caption converting information is not detected with respect to the main elementary stream, and an operation of reproducing a 3D caption is not performed.

When the 3D caption transport information is extracted from both of the main elementary stream and the sub elementary stream, the extractor 220 according to an exemplary embodiment may determine an elementary stream which includes the 3D caption converting information based on reproduction priorities of the main view video data and the sub view video data, and extract the 3D caption converting information from the corresponding elementary stream.

A caption according to an exemplary embodiment may be disposed within a caption window on a video screen. When the apparatus 270 reproduces a plurality of caption windows for displaying the caption, the caption windows may overlap with each other.

Accordingly, the caption determiner 230 according to an exemplary embodiment may determine a 3D caption priority and a reproduction location of the caption windows based on respective offsets of the caption windows. The caption determiner 230 according to another exemplary embodiment may assign a higher 3D caption priority and an offset to a caption window having a 2D caption priority to determine respective reproduction locations of the caption windows.

The reproducer 250 according to an exemplary embodiment may determine a caption based on the caption data, and display the caption in the plurality of caption windows at respective reproduction locations determined based on the respective offsets of the caption windows or the respective 3D caption priorities.

When caption data according to CEA-608 is extracted, the extractor 220 according to an exemplary embodiment may extract the 3D caption offset information according to service blocks from one of the 3D caption service block and the reserved region of the caption service descriptor in at least one table region from among the PMT region and the EIT region. Alternatively, when caption data according to CEA-708 is extracted, the extractor 220 according to an exemplary embodiment may extract the 3D caption offset information from one of the 3D caption service block and the reserved region of the caption service descriptor in at least one table region from among the PMT region and the EIT region.

Figure 3:
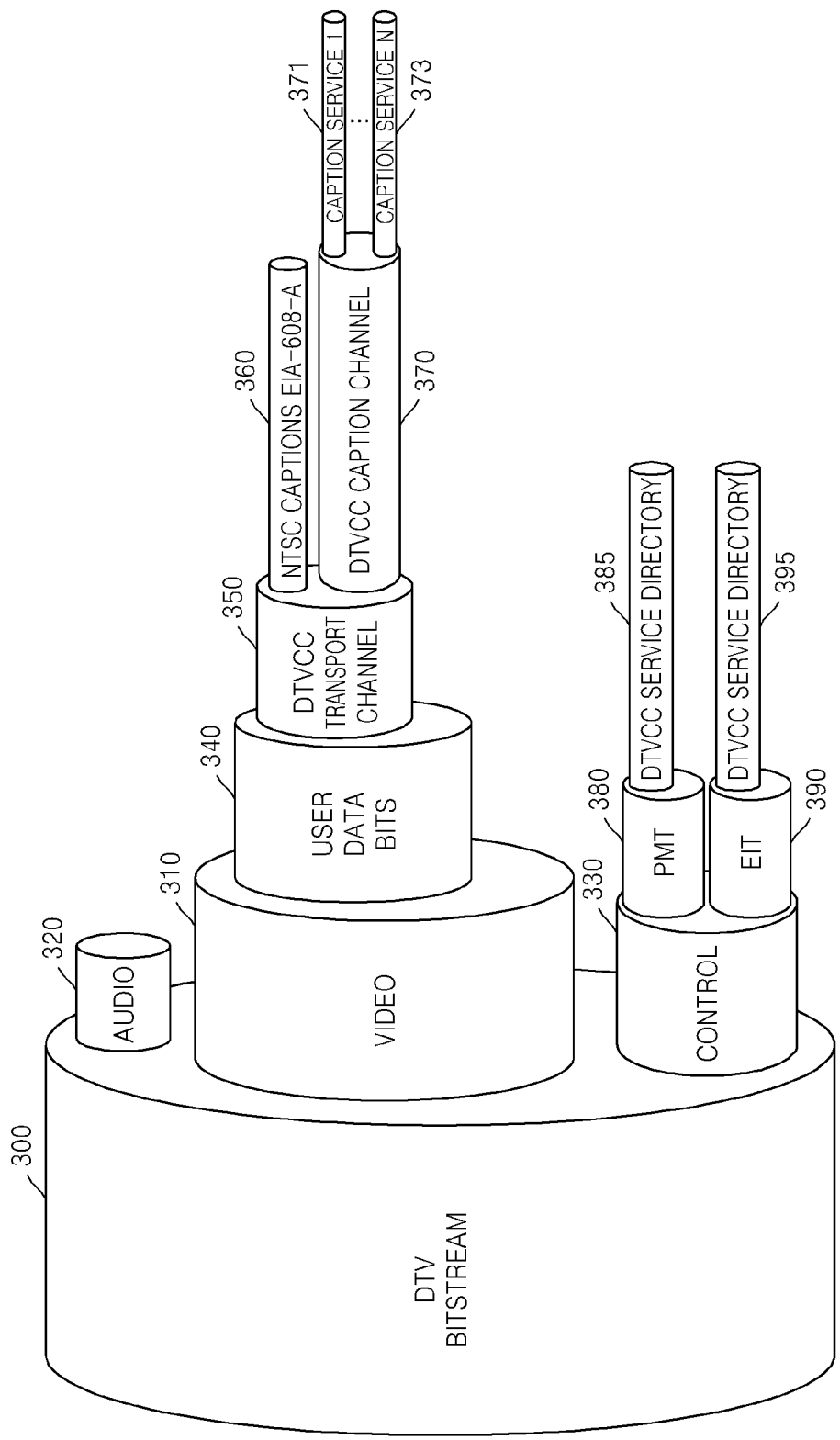
FIG. 3 illustrates a structure of digital television closed caption (DTV-CC) data of a DTV bitstream.

FIG. 3 illustrates a structure of DTV-CC data of a DTV bitstream 300.

The DTV bitstream 300 is a DTV system signal formed by multiplexing a video stream 310, an audio stream 320, and a control signal 330 which includes a PMT region 380 and an EIT region 390.

A caption (DTV-CC) transport channel 350 is transmitted via a user data bits portion 340 of the video stream 310. National television system committee (NTSC) caption data 360 according to CEA-608 (EIA-608-A) and a DTV-CC caption channel 370 which includes caption service data 371 and 373 according to CEA-708 are transmitted via the caption (DTV-CC) transport channel 350.

Caption related data may be included in the user data bits portion 340 of the video stream 310, the PMT 380, and the EIT 390. For example, the caption service data channels, including the caption service data 1 371, . . . through the caption service data n 373 include caption text data according to CEA-708 (EIA-608-A) and a caption window command. For example, caption channel service directory information 385 and 395 may be transmitted respectively via the PMT 380 and the EIT 390. The caption channel service directories 385 and 395 describe types and properties of caption services.

FIG. 4 illustrates a protocol model 400 of a caption channel.

A caption data channel is configured based on the protocol model 400 of the caption channel, and a hierarchical structure of caption transport may be described.

Caption channel data has a hierarchical structure including five layers, i.e., a transport layer 410, a packet layer 420, a service layer 430, a coding layer 440, and an interpretation layer 450.

DTV signal data 415 of the transport layer 410 corresponds to a form of a transport stream of the DTV bitstream 300 of FIG. 3, and the video stream 310, the audio stream 320, and the PMT region 380 or the EIT region 390 are multiplexed and transmitted via the DTV signal data 415.

The caption channel data is transmitted in a packet form within a DTV-CC data packet 425 of the packet layer 420.

DTV-CC service blocks 431, 433, and 435 of the service layer 430 include a caption service header and DTV-CC service data 441, 443, and 445. The caption service header includes information relating to a number of caption data channel services, a service type, and a service property.

In the coding layer 440, the DTV-CC service data 441, 443, and 445 describe how caption data is represented. A code value is assigned with respect to a code set region control, a caption window command, a caption character, and a caption symbol. The code value assigned in the coding layer 440 is defined by a DTV-CC code set table as illustrated in FIG. 5.

The interpretation layer 450 describes a graphic user interface of DTV-CC. A method for processing caption data is described by using caption data and caption window commands 451, 452, 453, 454, 455, and 456. For example, the interpretation layer 450 describes a method for generating a caption window for displaying a caption and a method for transmitting a space for preventing characters from overlapping when a caption is displayed in italics.

FIG. 5 illustrates a DTV-CC code set table according to CEA-708.

The DTV-CC code set table is classified into four code groups, i.e., CL, CR, GL, and GR groups. The CL group includes a C0 group 510 and a C2 group 530, the GL group includes a G0 group 550 and a G2 group 570, the CR group includes a C1 group 520 and a C3 group 540, and the GR group includes a G1 group 560 and a G3 group 580.

The CL and CR groups are regions for assigning a control code, and the GL and GR groups are regions for assigning a character and an icon.

Subset codes of an American Standard Code for Information Interchange (ASCII) control code are assigned to the C0 group 510 from among the CL and CR groups, and a caption control code is assigned to the C1 group 520. The C2 group 530 is a reserved region to which various control codes may be assigned, and the C3 group 540 is also a reserved region for a control code set.

Figures 6, 7:
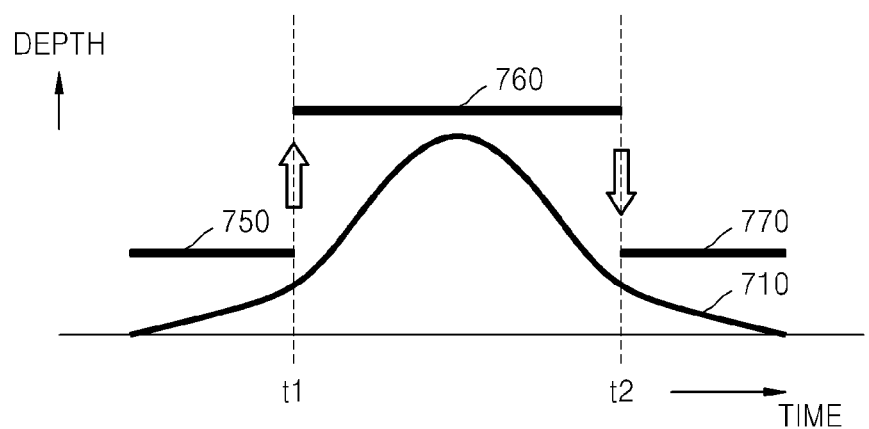
FIG. 6 illustrates a syntax of a caption service descriptor in a program map table (PMT) region or an event information table (EIT) region.
FIG. 7 shows graphs of a video offset and a caption window offset.

FIG. 6 illustrates a syntax of a caption service descriptor in a PMT region or an EIT region.

When a caption service is provided via a digital broadcast, caption data is transmitted via a caption transport channel and a caption service descriptor is transmitted via the PMT or EIT region.

The caption service descriptor describes caption information, such as caption type ("cc_type") 620 and a language code ("language") 610, for each of a plurality of caption services.

For example, when a value of the "cc_type" 620 is 1, a DTV-CC service according to CEA-708 is provided, and when it is 0, an NTSC CC service is provided.

FIG. 7 illustrates a graph of a video offset and a graph of a caption window offset.

When a video depth 710 changes according to time, a depth of a caption window may also change according to the video depth 710. However, when the depth of the caption window rapidly changes as the depth of the caption window rapidly increases from a first depth 750 to a second depth 760 at a time t1 and then rapidly decreases to a third depth 770 at a time t2 based on fluctuation of the video depth 710, a TV user may feel visually awkward, and even worse, become tired during a predetermined period of time as measured from at least one of the times t1 and t2 when the depth of the caption window rapidly changes, and thus, it may be inconvenient to watch a TV.

Figure 8:
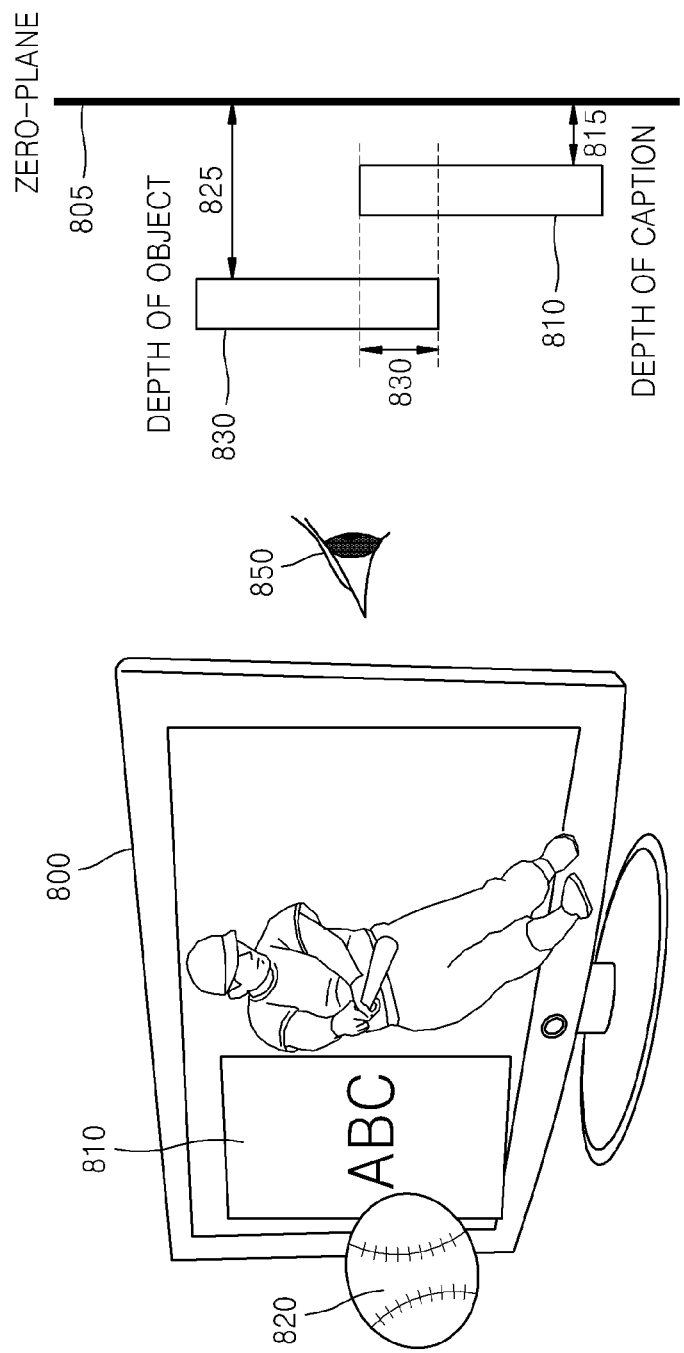
FIG. 8 illustrates a phenomenon where depths between an object and a caption window are reversed.

FIG. 8 illustrates a phenomenon by which depths between an object 820 and a caption window 810 are reversed in a 3D caption.

If the object 820 and the caption window 810 are simultaneously reproduced when a 3D video is reproduced on a screen 800 of a DTV, the caption window 810 needs to protrude more toward a TV user 850 than the object 820. However, if a depth 825 from a zero-plane 805 of the screen 800 to the object 820 is greater than a depth 815 from the zero-plane 805 to the caption window 810, the TV user 850 may feel visually awkward because a depth reverse phenomenon occurs in a section 830 within which the object 820 and the caption window 810 seem to overlap to the TV user 850.

The apparatus 100 according to an exemplary embodiment may generate a bitstream which includes the caption data and the 3D caption converting information by determining the 3D caption offset information, the caption offset converting speed information, the 3D caption size converting information, and the 3D caption transport information as the 3D caption converting information.

The apparatus 270 according to an exemplary embodiment may extract the 3D caption converting information which includes the 3D caption offset information, the caption offset converting speed information, the 3D caption size converting information, and the 3D caption transport information, together with the caption data from the received bitstream. The apparatuses 200 and 270 according to an exemplary embodiment may determine the location and the size of the caption window for a 3D caption by using the 3D caption offset information, the caption offset converting speed information, and the 3D caption size converting information.

The apparatus 270 may reproduce the caption data in a 3D caption based on the determined location and size of the caption window.

Hereinafter, an operation of the apparatus 100 according to an exemplary embodiment relating to determining the 3D caption converting information and transmitting the 3D caption converting information with the caption data, an operation of the apparatuses 200 and 270 according to an exemplary embodiment relating to receiving the 3D caption converting information with the caption data, and an operation of the apparatus 270 relating to reproducing a 3D caption by using the caption data and the 3D caption converting information, which are performed to provide a digital broadcasting service providing a caption service, are described with reference to FIGS. 9 through 24.

Specifically, exemplary embodiments relating to using the 3D caption offset information are described with reference to FIGS. 9, 10, 11, 12, 13, and 14, exemplary embodiments relating to using the 3D caption size converting information are described with reference to FIGS. 15, 16, 17, and 18, and exemplary embodiments relating to using the 3D caption size converting information are described with reference to FIGS. 19, 20, and 21.

For convenience of description, exemplary embodiments in which the apparatus 100 according to an exemplary embodiment and the apparatuses 200 and 270 according to an exemplary embodiment use a closed caption as a caption format are mainly described. However, uses and operation principles of the 3D caption converting information in the apparatus 100 according to an exemplary embodiment and the apparatuses 200 and 270 according to an exemplary embodiment are not limited to a closed caption.

A caption offset of the 3D caption offset information according to an exemplary embodiment may include at least one of a depth, a disparity, and a binocular parallax between a main view caption and a sub view caption required to reproduce caption data in a 3D caption. Alternatively, the caption offset may include at least one of a depth, a disparity, and binocular parallax from a zero-plane to the main view caption or the sub view caption.

The apparatus 100 according to an exemplary embodiment may determine the 3D caption offset information to be in a form of at least one of a service block, a caption window command, and a caption service descriptor.

Figure 9:
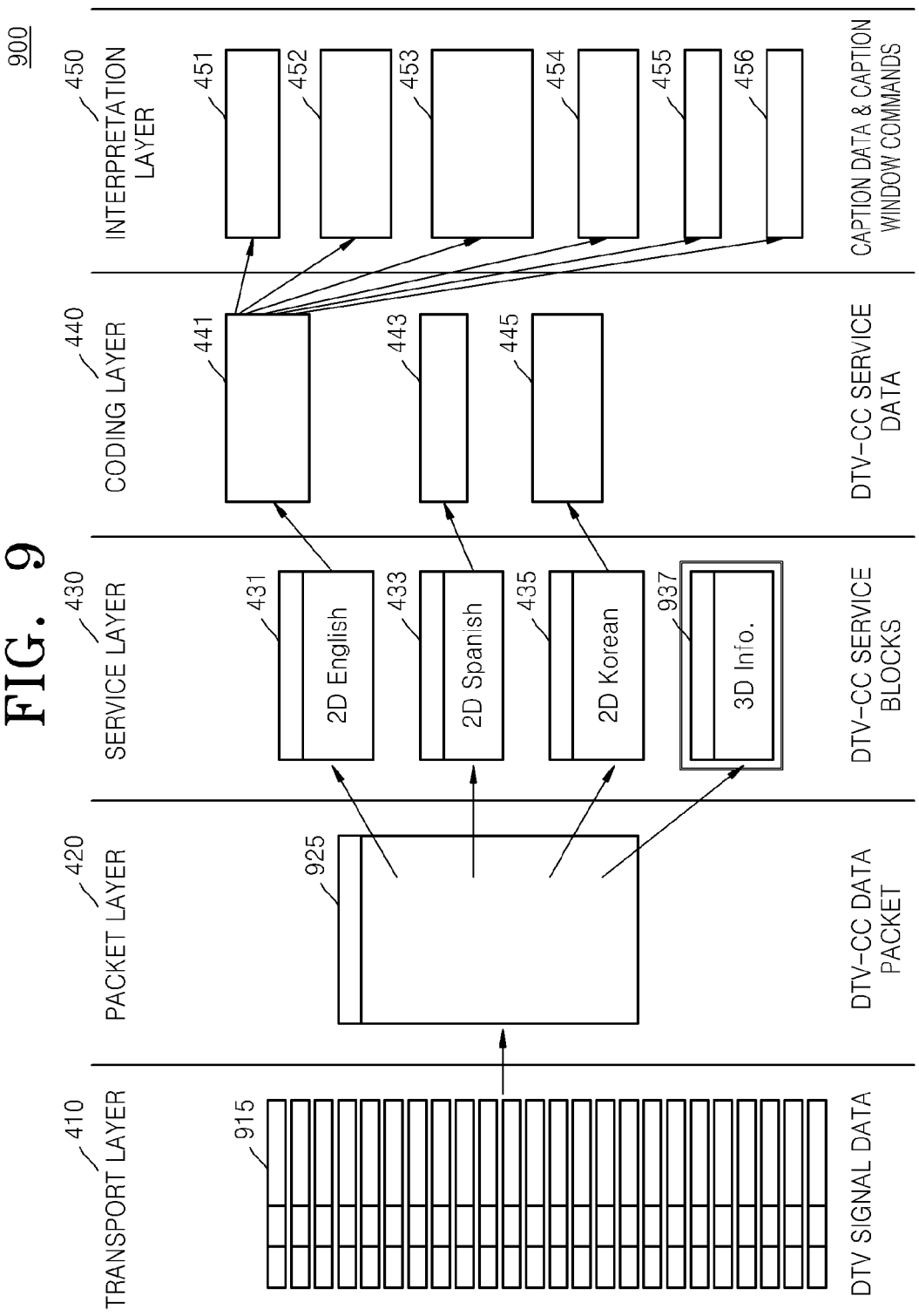
FIG. 9 illustrates service blocks for transporting 3-dimensional (3D) caption offset information according to an exemplary embodiment.

FIG. 9 illustrates service blocks for transmitting the 3D caption offset information according to an exemplary embodiment.

The apparatus 100 according to an exemplary embodiment may generate a 3D caption service block 937 which includes the 3D caption offset information. The apparatus 100 according to an exemplary embodiment may insert the 3D caption service block 937 into a user data region of DTV signal data 915.

A protocol model 900 of DTV-CC data includes the 3D caption service block 937 generated by the apparatus 100 according to an exemplary embodiment in addition to the protocol model 400 of FIG. 4. The 3D caption service block 937 may be transmitted in conjunction with DTV-CC service blocks 431, 433, and 435, including 2D caption data via a DTV-CC data packet 925 and the DTV signal data 915.

Table 1 shows an example of a DTV-CC caption service that may be generated by the apparatus 100 according to an exemplary embodiment.

TABLE 1

| | Services |
|---|---|
| CEA-608 | CC1 (default) |
| | CC2 |
| | CC3 |
| | CC4 |
| CEA-708 | Service1 (default) |
| | ... |
| | Service5 |
| | Service6 |
| 3D | 3D_service |

The apparatus 100 according to an exemplary embodiment may generate the DTV-CC data in a form of a plurality of caption service blocks. Caption service blocks including 2D caption data "CC1", "CC2", "CC3", and "CC4" according to CEA-608 and caption service blocks including caption services "Service1", ..., "Service5", "Service6" according to CEA-708 may be transported.

Further, the apparatus 100 according to an exemplary embodiment may transmit the 3D caption service block 937 including the 3D caption converting information according to an exemplary embodiment in a form of a service block "3D_service". The apparatus 100 according to an exemplary embodiment may assign the 3D caption service block 937 to one of a plurality of preliminary caption service blocks having extended service numbers from 7 to 63, from among caption service blocks.

The apparatuses 200 and 270 may extract the DTV-CC service blocks 431, 433, and 435 and the 3D caption service block 937 from the user data region by de-multiplexing the received DTV signal data 915. The apparatus 270 may extract caption data by selecting one of the DTV-CC service blocks 431, 433, and 435, and reproduce a caption.

Each of the apparatuses 200 and 270 according to an exemplary embodiment reads an offset, such as a depth, a disparity, or a binocular parallax of a caption based on the 3D caption offset information of the 3D caption service block 937 and assigns the offset to 2D caption data of a caption service block selected to be reproduced from among the DTV-CC service blocks 431, 433, and 435, thereby determining locations of a main view caption window and a sub view caption window.

Because a general 2D broadcasting receiver is unable to recognize the 3D caption service block according to an exemplary embodiment, the general 2D broadcasting receiver is unable to read the 3D caption converting information according to an exemplary embodiment. Accordingly, the general 2D broadcasting receiver may reproduce a 2D caption by using 2D caption data of another caption service block while ignoring the 3D caption service block according to an exemplary embodiment. Thus, even when the apparatus 100 according to an exemplary embodiment and the apparatuses 200 and 270 according to an exemplary embodiment transmit and receive the 3D caption converting information according to an exemplary embodiment via a broadcasting bitstream, a function of reproducing a 2D caption is still provided in the general 2D broadcasting receiver, and thus, lower compatibility regarding a general 2D caption system may be expected.

The apparatus 100 according to an exemplary embodiment may transmit the caption window command based on CEA-708 via the caption service data of the bitstream. The apparatus 100 according to an exemplary embodiment may determine the 3D caption offset command for setting the 3D caption offset information based on the format of the caption window command. The 3D caption offset command according to an exemplary embodiment may be configured to assign the respective 3D caption offset information for each of a plurality of caption services.

The apparatus 100 according to an exemplary embodiment may determine the 3D caption offset command by using an EXT1 code of the C0 group 510 in the DTV-CC code set table described above with reference to FIG. 5.

FIG. 10 illustrates a 3D caption offset command according to an exemplary embodiment.

The apparatus 100 according to an exemplary embodiment may define a 3D caption offset command "SetBaseDepth" according to an exemplary embodiment. A command code of the 3D caption offset command "SetBaseDepth" may be defined as a 2-byte code in a format of "EXT1+0x08+<data>".

A command format of the 3D command offset command "SetBaseDepth" may be, for example, "SetBaseDepth(Base Offset Sign, Base Offset)." A parameter of the 3D caption offset command "SetBaseDepth" may include a parameter "bos" which indicates a base offset sign and a parameter "bof" which indicates a base offset.

The parameter "bos" may indicate whether the binocular parallax between the main view caption window and the sub view caption window is in a negative (−) direction or a positive (+) direction.

The parameter "bof" may indicate an offset or an interval between the main view caption window and the sub view caption window.

Accordingly, the offset between the main view caption window and the sub view caption window may be provided regardless of a type of the caption data, by the 3D caption offset command "SetBaseDepth" according to an exemplary embodiment. A transmission cycle of the 3D caption offset command "SetBaseDepth" according to an exemplary embodiment may be set based on a frame rate. For example, if a 3D caption offset command "SetBaseDepth" is transmitted per frame section including a predetermined number of consecutive frames in a frame rate of one cycle, the same offset may be applied to all frames in the frame section. Alternatively, the transmission cycle of the 3D caption offset command "SetBaseDepth" may be set to be a longest frame section possible in a frame rate of one cycle.

Each of the apparatuses 200 and 270 may extract the 3D caption offset command from the caption service data region in the bitstream. Each of the apparatuses 200 and 270 may read the 3D caption offset information of the current caption service based on the 3D caption offset command. Each of the apparatuses 200 and 270 may read an offset direction and the offset between the main view caption window and the sub view caption window by using the 3D caption offset command, and determine the locations of the main view caption window and the sub view caption window for a 3D caption.

Further, the apparatus 100 according to an exemplary embodiment may determine the 3D caption transport information, and insert and transport the 3D caption transport information into the caption service descriptor in at least one table region from among the PMT region and the EIT region.

The 3D caption transport information according to an exemplary embodiment may include 3D caption service block transport information indicating that the 3D caption service block is transmitted, and 3D caption window command transport information indicating that the 3D caption window command is transmitted.

The apparatus 100 according to an exemplary embodiment may determine and insert at least one of the 3D caption service block transport information and the 3D caption window command transport information into first, second, and third reserved regions 650, 660, and 670 shown in FIG. 6.

For example, the apparatus 100 according to an exemplary embodiment may insert the 3D caption service transport information "flag_3D" into the first reserved region 650 of the caption service descriptor. If a current bitstream only includes 2D caption data, a value of "flag_3D" may be set to 0, and if the current bitstream includes 3D caption data or a 3D caption service block, the value of "flag_3D" may be set to 1.

For example, the apparatus 100 according to an exemplary embodiment may insert the 3D caption window command transport information "3D_708_CC" into the third reserved region 670 of the caption service descriptor. If a current CEA-708 caption stream includes the 3D caption window command, a value of "3D_708_CC" may be set to 0, and if the current CEA-708 caption stream does not include the 3D caption window command, the value of "3D_708_CC" may be set to 1.

Accordingly, each of the apparatuses 200 and 270 may extract the 3D caption service block transport information from the first reserved region 650 of the caption service descriptor in the PMT or EIT region to read whether the current bitstream includes the 3D caption service block, and determine whether to extract and interpret the 3D caption service block based on the result of reading.

Further, each of the apparatuses 200 and 270 may extract the 3D caption window command transport information from the third reserved region 670 of the caption service descriptor to determine whether the current CEA-708 caption stream includes the 3D caption window command, and determine whether to extract and interpret the 3D caption window command based on the result of reading.

Accordingly, each of the apparatuses 200 and 270 may pre-check an existence of the 3D caption information and determine whether to reproduce a 3D caption by extracting the 3D caption transport information from the PMT region, instead of using the video stream of the digital broadcasting stream.

FIGS. 11 and 12 respectively illustrate a 3D caption service block according to an exemplary embodiment and an exemplary embodiment relating to determining a 3D caption window by using a 3D caption offset command.

When each of the apparatuses 200 and 270 according to an exemplary embodiment extracts a 3D caption service block "3D_service" 1130 from a current bitstream, base offset information 1150 may be read from the "3D_service" 1130.

A transmitting cycle of the "3D_service" 1130 according to an exemplary embodiment may be arbitrarily set. For example, the "3D_service" 1130 may be received by using a frame section including a predetermined number of consecutive frames in a frame rate as a cycle.

Each of the apparatuses 200 and 270 according to an exemplary embodiment may generate a caption window 1140 regardless of a type of CEA-608 caption data 1110 or CEA-708 caption data 1120. Further, each of the apparatuses 200 and 270 according to an exemplary embodiment may determine a 3D caption window 1160 by determining respective locations of the main view caption window and the sub view caption window by applying the base offset information 1150 to the caption window 1140.

Upon receiving CEA-708 caption data 1210, each of the apparatuses 200 and 270 according to an exemplary embodiment may generate a caption window 1220 of the CEA-708 caption data 1210 and analyze 3D caption window command 1230 to read respective offset information for each of caption windows of a current caption service. In particular, each of the apparatuses 200 and 270 according to an exemplary embodiment may read offset information for the caption window 1220 of the current caption service from the 3D caption window command 1230.

Each of the apparatuses 200 and 270 according to an exemplary embodiment may determine respective locations of the main view caption window and the sub view caption window of a 3D caption window 1240 based on the offset information for the caption window 1220 of the current caption service.

Figure 13:
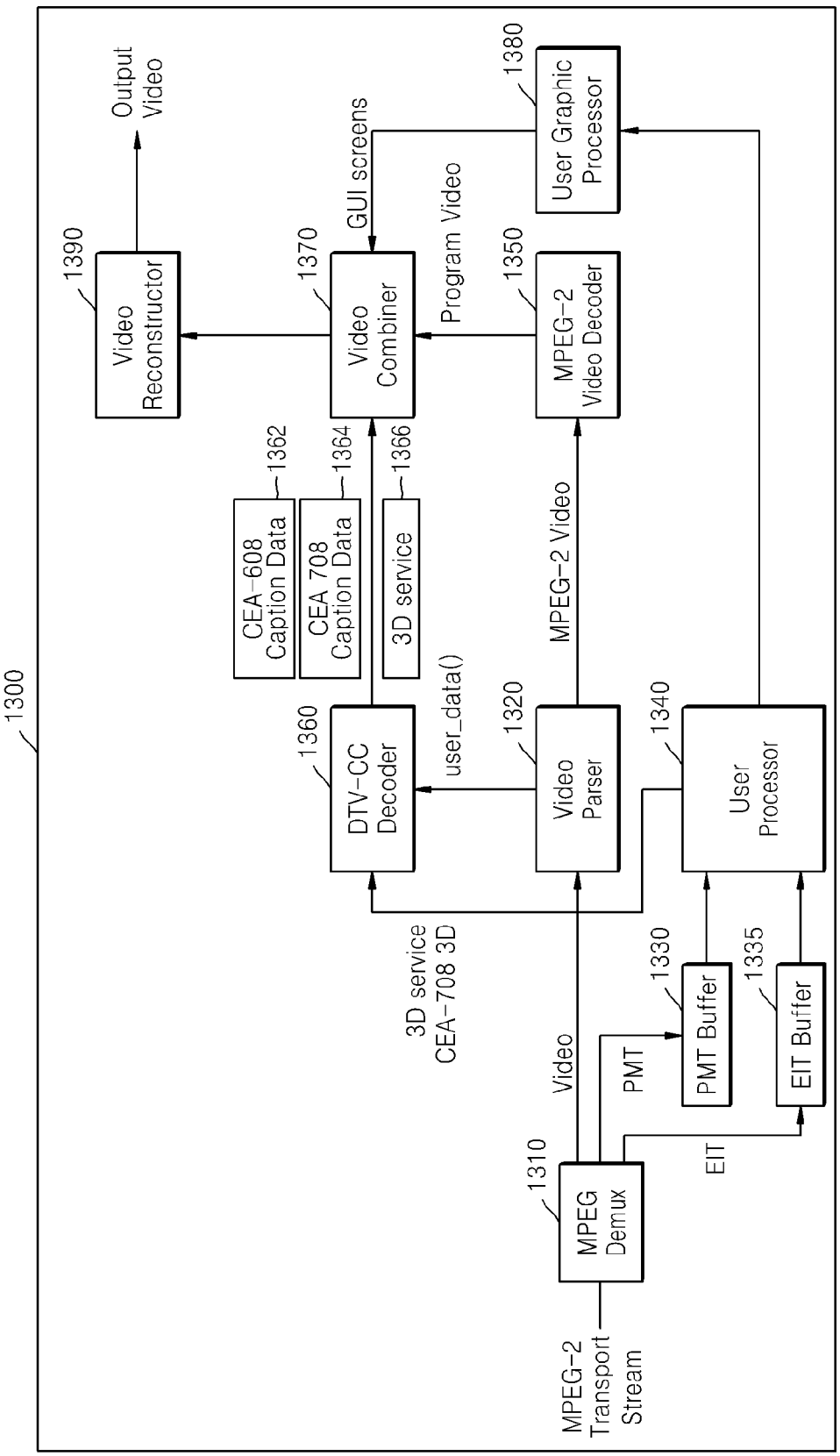
FIG. 13 is a block diagram of a video decoding system for reproducing caption data as a 3D caption by using 3D caption offset information, according to an exemplary embodiment.

FIG. 13 is a block diagram of a video decoding system 1300 for reproducing caption data as a 3D caption by using 3D caption offset information, according to an exemplary embodiment.

The video decoding system 1300 according to an exemplary embodiment may correspond to the apparatus 270. The video decoding system 1300 according to an exemplary embodiment may reconstruct and reproduce a video upon receiving an MPEG-2 transport stream.

The received MPEG-2 transport stream is de-multiplexed into a video stream, PMT information, and EIT information by using an MPEG de-multiplexer (MPEG Demux) 1310.

The video stream may be transmitted to a video parser 1320, and the video parser 1320 may parse the video stream in order to extract video data encoded based on MPEG-2, and user data. The extracted user data may be transmitted to a DTV-CC decoder 1360.

The PMT information and the EIT information extracted from the MPEG-2 transport stream are respectively stored in a PMT buffer 1330 and an EIT buffer 1335. A user processor 1340 may determine whether the 3D caption service block or the 3D caption window command is included in the current bitstream by reading the 3D caption service block transport information "flag_3D" and the 3D caption window command transport information "3D_708_CC" from the PMT information and the EIT information. The DTV-CC decoder 1360 may extract CEA-608 caption data 1362, CEA-708 caption data 1364, and 3D caption information service block "3D_service" 1366 from the user data extracted by the video parser 1320.

An MPEG-2 video decoder 1350 may reconstruct a program video by decoding the video data encoded based on MPEG-2, and output the program video to a video combiner 1370. Specifically, a main view video and a sub view video of a 3D video may be reconstructed.

Further, the user processor 1340 may extract various pieces of additional information from various section tables, and a user graphic processor 1380 may generate a graphic user interface (GUI) screen by using the additional information and output the GUI screen to the video combiner 1370.

The video combiner 1370 may determine a location of a caption window for displaying a caption on a video screen by using the CEA-608 caption data 1362 or the CEA-708 caption data 1364 and the 3D caption service block 1366, generate a caption by using the CEA-608 caption data 1362 or the CEA-708 caption data 1364, and display the caption in the caption window.

Specifically, a reproducing form of the CEA-608 caption data 1362 or the CEA-708 caption data 1364 may be determined based on the 3D caption converting information of the "3D_service" 1366. Accordingly, respective locations of the main view caption window and the sub view caption window for displaying the caption and a font size of the caption may be determined based on the 3D caption converting information.

The video combiner 1370 may combine the main view caption window and the sub view caption window respectively with the main view video and the sub view video. Alternatively, the video combiner 1370 may combine the GUI screen with a video.

A video reconstructor 1390 may receive video pictures in which the caption, the videos, and GUI screens are combined, output by the video combiner 1370, and restore and output a video sequence. When a 3D video sequence is reconstructed with a 3D caption, the 3D caption may be reproduced with reproduction of the 3D video.

Figure 14:
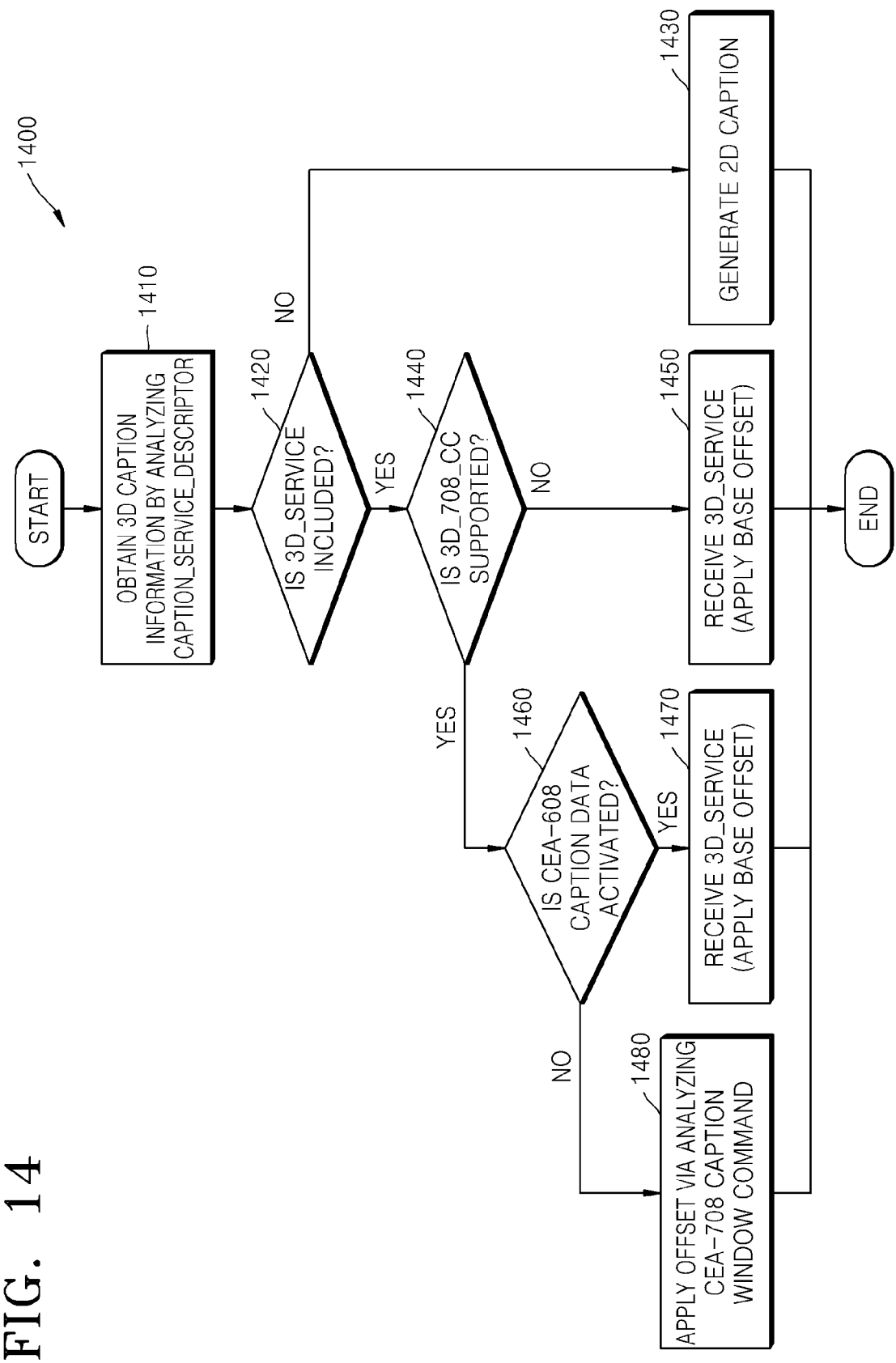
FIG. 14 is a flowchart illustrating a method of reproducing a caption by using 3D caption offset information, according to an exemplary embodiment.

FIG. 14 is a flowchart 1400 illustrating a method for reproducing a caption by using 3D caption offset information, according to an exemplary embodiment.

In operation 1410, each of the apparatuses 200 and 270 may extract the 3D caption information from a caption service descriptor "caption_service_descriptor." For example, the 3D caption service block transport information "flag_3D" and the 3D caption window command transport information "3D_708_CC" according to an exemplary embodiment may be extracted from the caption service descriptor.

Then, in operation 1420, each of the apparatuses 200 and 270 may determine whether the 3D caption service block "3D_service" is included in the current bitstream based on the 3D caption service block transport information "flag_3D." If it is determined that the 3D caption service block "3D_service" is not included in the current bitstream, operation 1430 is performed so that a 2D caption is generated by using the caption data.

If it is determined that the 3D caption service block "3D_service" is included in the current bitstream, each of the apparatuses 200 and 270 may determine whether the 3D caption window command is included in current caption service data based on the 3D caption window command transport information "3D_708_CC," in operation 1440. If it is determined that the 3D caption window command is not included in the current caption service data, operation 1450 is performed.

In operation 1450, each of the apparatuses 200 and 270 may generate a 3D caption by determining the respective locations of the main view caption window and the sub view caption window to display a caption, by reading the 3D caption offset information of the 3D caption service block "3D_service."

If it is determined that the 3D caption window command is included in the current caption service data as a result of operation 1440, operation 1460 is performed to determine whether CEA-608 caption data is activated in the caption data.

If it is determined that the CEA-608 caption data is activated as a result of operation 1460, each of the apparatuses 200 and 270 may determine the locations of the main view caption window and the sub view caption window for displaying a 3D caption by reading the 3D caption offset information of the 3D caption service block "3D_service" in operation 1470.

If it is determined that the CEA-608 caption data is not activated as a result of operation 1460, a CEA-708 caption window command may be analyzed and applied to the CEA-708 caption data in operation 1480. In particular, the 3D caption offset command and the CEA-708 caption data may be extracted from the CEA-708 caption service data, and a 3D caption may be generated by applying the 3D caption offset to the CEA-708 caption data.

Further, the apparatus 100 according to an exemplary embodiment may transport the 3D caption offset information via the reserved region of the caption service descriptor in the PMT or EIT region of the section table region, instead of transporting the 3D caption offset information via the caption service block or the caption window command. Table 2 below shows a syntax which includes the 3D caption offset information which is insertable into the third reserved region 670 of the caption service descriptor.

TABLE 2

| Syntax |
| --- |
| If(caption_service_number == 3D_service){ |
|    base_offset_sign |
|    base_offset |
| } |
| Reserved |

In particular, base offset sign information "base_offset_sign" and a base offset value "base_offset" may be set as the 3D caption offset information.

Further, the apparatus 100 according to an exemplary embodiment may generate a separate descriptor which includes the 3D caption offset information of Table 2, and transmit the 3D caption offset information via a descriptor region of the PMT or EIT region of the section table region.

Accordingly, each of the apparatuses 200 and 270 may read whether the current bitstream includes the 3D caption service block by extracting the 3D caption service block transport information from the first reserved region 650 of the caption service descriptor of the PMT or EIT region, or extracting the descriptor including the 3D caption offset information from the descriptor region of the PMT or EIT region, and determine whether to extract and interpret the 3D caption service block.

Further, when it is read that the current bitstream includes the 3D caption service block based on the 3D caption service block transport information extracted from the first reserved region 650 of the caption service descriptor, each of the apparatuses 200 and 270 may extract the base offset sign information "base_offset_sign" and the base offset value "base_offset" from the third reserved region 670 for the caption service wherein the caption service identification number "caption_service_number" is "3D_service," and read the offset direction and the offset value of the caption window for a 3D caption.

Accordingly, each of the apparatuses 200 and 270 may check the existence of a 3D caption by extracting the 3D caption information from the PMT or EIT region instead of using a video stream of a digital broadcasting stream, and read the 3D caption offset information.

The caption offset converting speed information according to an exemplary embodiment may include at least one of information indicating an offset variation between caption windows of a current frame and a following frame, information indicating a direction of an offset variation, target offset information, and caption converting window identification information indicating a caption window within which a caption conversion occurs. The information relating to the offset variation for a 3D caption according to an exemplary embodiment may indicate a difference between respective offsets of captions in a current frame and a following frame. The apparatus 100 according to an exemplary embodiment may determine the caption offset converting speed information as a form of the caption window command.

The apparatus 100 according to an exemplary embodiment may determine the caption offset converting speed command for setting the caption offset converting speed information.

For example, the caption offset converting speed command may be assigned to a 3-byte code region of the C2 group 530 that is a reserved region of the control code in the DTV-CC code set table described above with reference to FIG. 5. The caption offset converting speed command according to an exemplary embodiment may set the caption offset converting speed information for each of a plurality of caption windows of the current caption service.

Figures 15, 16:
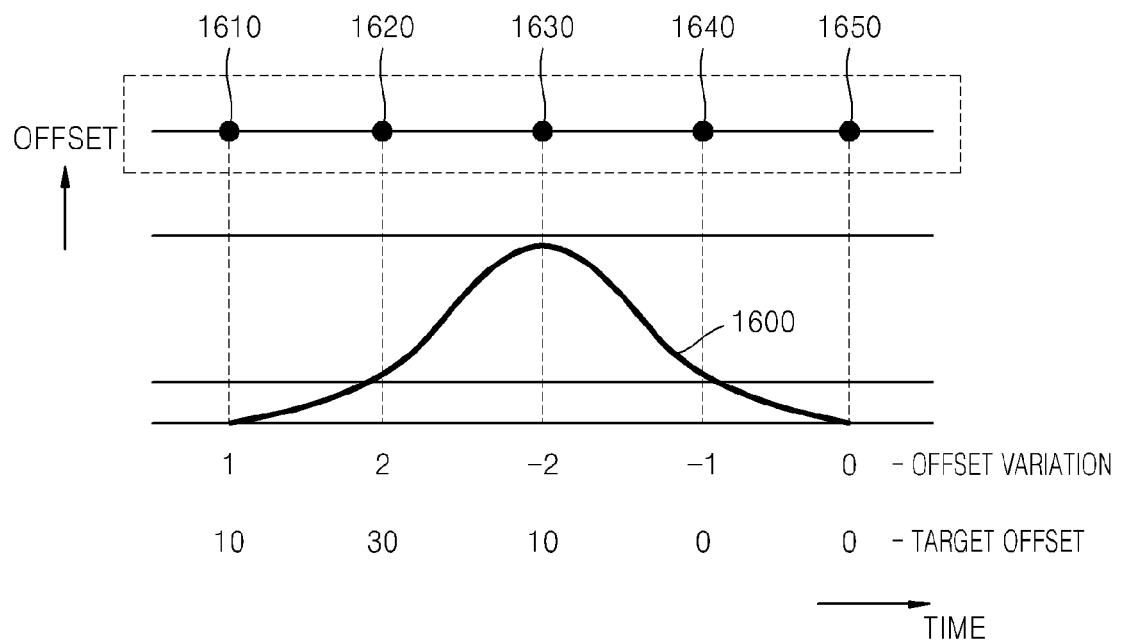
FIG. 15 illustrates a caption offset converting speed command according to an exemplary embodiment.
FIG. 16 is an offset changing graph of a 3D caption using caption offset converting speed information, according to an exemplary embodiment.

FIG. 15 illustrates a caption offset converting speed command "DisparityStep" according to an exemplary embodiment.

A command format of the caption offset converting speed command "DisparityStep" according to an exemplary embodiment may include "DisparityStep(Window_id, Target disparity sign, Step size, Target disparity)." A parameter of the caption offset converting speed command "DisparityStep" according to an exemplary embodiment may include a parameter "Window_id" for identifying a caption window, a parameter "Target disparity sign" indicating a target offset direction of a caption window, a parameter "Step size" indicating an offset variation between offsets of caption windows of a current frame and a following frame, and a parameter "Target disparity" indicating a target offset of a caption window.

A command code of the caption offset converting speed command "DisparityStep" according to an exemplary embodiment may be assigned as a code 0x12 from among extended code region of a DTV-CC code set table.

The parameter "Window_id" indicates an intrinsic identifier of a caption window, and may be assigned with 3 bits (i.e., id0, id1, and id2).

Because the parameter "Target disparity sign" indicates whether the target offset direction is in a negative (−) or positive (+) direction, one bit may be assigned to the parameter "Target disparity sign."

The parameter "Target disparity" is a target offset of a caption window, and an offset no longer changes when the target offset is reached as an offset of a caption increase or decrease. Eight bits (i.e., dis0, dis1, dis2, dis3, dis4, dis5, dis6, and dis7) may be assigned to the parameter "Target disparity."

The parameter "Step size" may indicate an offset variation added to an offset of a caption window of a current frame to determine an offset of a caption window of a following frame, as an offset variation between the caption windows of the current frame and the following frame. Four bits (i.e., st0, st1, st2, and st3) may be assigned to the parameter "Step size."

FIG. 16 is an offset changing graph of a 3D caption using caption offset converting speed information, according to an exemplary embodiment.

The caption offset converting speed command "DisparityStep" described above with reference to FIG. 15 may set the offset variation of the offsets between the caption windows of the current frame and the following frame, and the target offset.

For example, a first caption offset converting speed command "DisparityStep" may set a target offset direction to be "+," an offset variation to be "1," and a target offset to be "10" at a time 1610. According to the first caption offset converting speed command "DisparityStep," an offset of the caption window may increase by "1" per frame until it reaches "10."

When the offset reaches "10" at a time 1620, the offset does not change according to the first caption offset converting speed command "DisparityStep." Accordingly, a second caption offset converting speed command "DisparityStep" may be generated. The second caption offset converting speed command "DisparityStep" may set a target offset direction to be "+," an offset variation to be "2," and a target offset to be "30." According to the second caption offset converting speed command "DisparityStep," the offset of the caption window may increase by "2" per frame until it reaches "30."

When the offset reaches "30" at a time 1630, the offset does not change according to the second caption offset converting speed command "DisparityStep," and a third caption offset converting speed command "DisparityStep" is generated. The third caption offset converting speed command "DisparityStep" may set a target offset direction to be "−," an offset variation to be "2," and a target offset to be "10." According to the third caption offset converting speed command "DisparityStep," the offset of the caption window may decrease by "2" per frame until it reaches "10."

When the offset reaches "10" at a time 1640, the offset does not change according to the third caption offset converting speed command "DisparityStep," and a fourth caption offset converting speed command "DisparityStep" is generated. The fourth caption offset converting speed command "DisparityStep" may set a target offset direction to be "−," an offset variation to be "1," and a target offset to be "0."

When the offset reaches "0" at a time 1650 as the offset decreases by "1" per frame according to the fourth caption offset converting speed command "DisparityStep," the offset may be stopped from being converted according to the fourth caption offset converting speed command "DisparityStep."

Accordingly, because the offset is gently changed as shown by a curve 1600 according to frames or time, based on the caption offset converting speed command "DisparityStep" according to an embodiment, conversion between a 2D caption and a 3D caption may be smoothly performed.

A process for changing the offset of the caption window according to the caption offset converting speed command "DisparityStep" according to an exemplary embodiment may follow a syntax as shown in Table 3 below.

TABLE 3

Process according to 'DisparityStep'
For(j=0; j < window count; j++){
 While( disparity[j][i] < target disparity[j]){
  disparity[j][i+1] = disparity[j][i] + step;
  i++;
 }
}

The caption offset converting speed command "DisparityStep" may set an offset for each of a plurality of caption windows. In Table 3, j denotes an identification number of a caption window, and i denotes an identification number of a frame according to time. An offset "disparity[j][i+1]" of a caption window of a following (i+1)th frame may be determined by adding an offset variation "step" to an offset "disparity[j][i]" of a caption window of a current (i)th frame. Offsets of consecutive frames may be changed as a target offset "target disparity[j]" is set for a (j)th caption window and the offset "disparity[j][i]" of the caption window of the current (i)th frame is increased until the target offset "target disparity[j]" is reached. The process for changing the offset of the caption window according to the caption offset converting speed command "DisparityStep" according to an exemplary embodiment is illustrated in a diagram form in FIG. 17.

Figure 17:
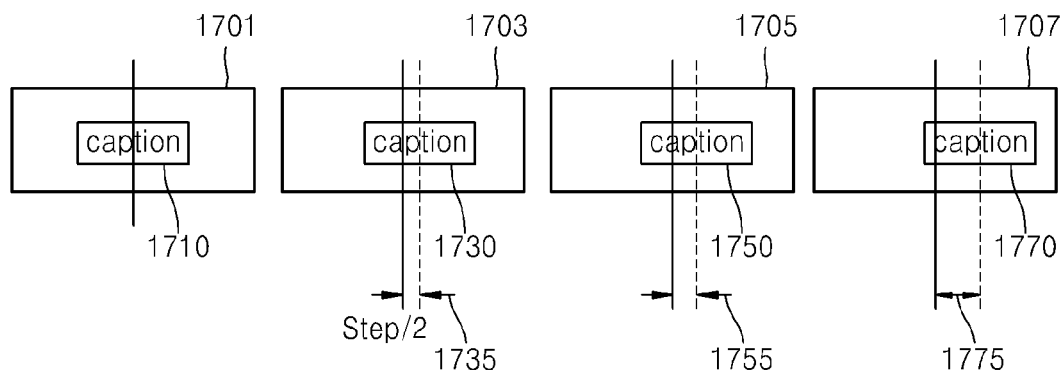
FIG. 17 illustrates 3D caption processing screens using caption offset converting speed information, according to an exemplary embodiment.

FIG. 17 illustrates 3D caption processing screens which use caption offset converting speed information, according to an exemplary embodiment.

Left view caption windows 1710, 1730, 1750, and 1770 may be respectively disposed on an (i)th left view frame 1701, an (i+1)th left view frame 1703, an (i+2)th left view frame 1705, and an (i+3)th left view frame 1707.

"Step/2" that is a half of the offset variation "Step" may be added to each of an offset of a left view caption window and an offset of a right view caption window from a center of 2D caption window, based on the offset variation "Step" of the caption offset converting speed command "DisparityStep" according to an exemplary embodiment.

Respective offsets 1735, 1755, and 1775 of the corresponding left view caption windows 1730, 1750, and 1770 may be increased by "Step/2" from the left view caption window 1710 having an offset of 0, according to an order from the (i)th left view frame 1701 to the (i+3)th left view frame 1707.

The apparatus 100 according to an exemplary embodiment may determine the caption offset converting speed command "DisparityStep" for setting the caption offset converting speed information, and insert and transport the caption offset converting speed command "DisparityStep" into the caption service data region of the video stream of the digital broadcasting bitstream.

Each of the apparatuses 200 and 270 may read the caption offset converting speed command "DisparityStep" from the caption service data region of the video stream by parsing the received digital broadcasting bitstream, determine a caption window within which an offset is converted based on the caption offset converting speed command "DisparityStep," and cause the offset of the caption window to be changed until the cumulative offset reaches a target offset by reading a target offset direction and an offset variation of the caption window.

Further, the apparatus 100 according to an exemplary embodiment may determine the target offset information indicating the target offset of the 3D caption window and the caption offset converting speed command for setting the caption converting section information indicating a section where a caption depth is converted. The caption converting section information for a 3D caption, according to an exemplary embodiment, may indicate a number of frames from a frame at which a caption conversion is started to a frame where the caption conversion is completed.

A command format of a command offset converting speed command "SmoothTransition" according to another exemplary embodiment may be "SmoothTransition(Target disparity, Applied Frame Number)." A parameter of the caption offset converting speed command "SmoothTransition" according to an exemplary embodiment may include a parameter "Target disparity" which indicates a target offset of a caption window and a parameter "Applied Frame Number" which indicates a number of frames from a frame at which a caption conversion is started to a frame where the caption conversion is completed.

Each of the apparatuses 200 and 270 may read the caption offset conversion speed command "SmoothTransition" from the caption service data region of the video stream, and read the parameters "Target disparity" and "Applied Frame Number" from the caption offset converting speed command "SmoothTransition."

Each of the apparatuses 200 and 270 may determine a target offset to be changed from a current caption window based on the parameter "Target disparity," and determine a total number of consecutive frames at which an offset conversion of a caption window occurs based on the parameter "Applied Frame Number." Accordingly, each of the apparatuses 200 and 270 may determine an offset variation between frames based on the target offset and the total number of consecutive frames at which the offset conversion occurs, such that the offset of the caption window of the current frame smoothly changes to the target offset during the consecutive frames at which the offset conversion occurs.

Figure 18:
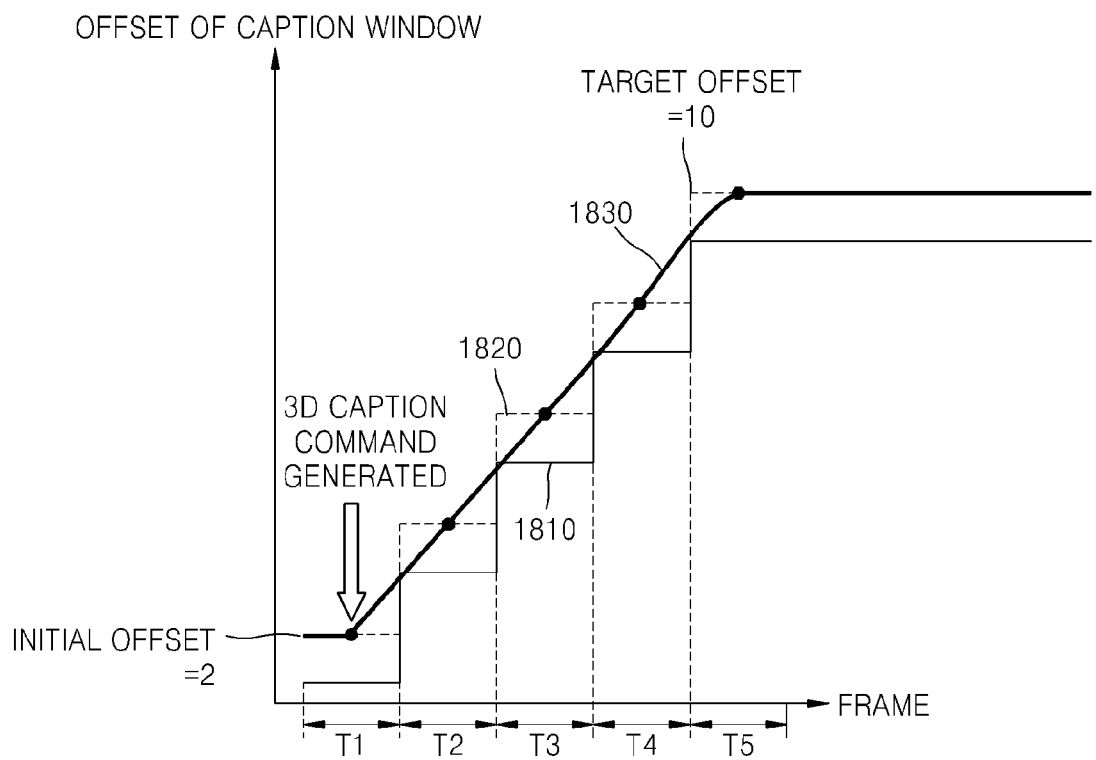
FIG. 18 is an offset changing graph of a 3D caption using caption offset converting speed information, according to another exemplary embodiment.

FIG. 18 is an offset changing graph of a 3D caption using caption offset converting speed information, according to another exemplary embodiment.

Graphs 1810 and 1820 respectively show an offset of a video and an offset of a caption window. Sections T1, T2, T3, T4, and T5 are respectively sections in which a first frame, a second frame, a third frame, a fourth frame, and a fifth frame are reproduced. The graphs 1810 and 1820 show that the offset of the caption window increases as the offset of the video fluctuates with respect to an order of frames.

For example, each of the apparatuses 200 and 270 may perform a caption conversion based on a caption offset converting speed command "SmoothTransition(10, 4)" in a frame section T1.

When an initial offset of the caption window is "2" in the frame section T1, the offset of the caption window may increase during each of four consecutive frames until reaching a target offset which is equal to "10." Each of the apparatuses 200 and 270 may determine an offset variation between frames according to Relational Expression 1 as shown below.

Offset Variation between Frames=(Target Offset−Initial Offset)/Number of Frames During Caption Offset Conversion  [Relational Expression 1]

Accordingly, each of the apparatuses 200 and 270 may determine the offset variation to be 2=(10−)/4, and increase the offset of the caption window by 2 per frame until the offset is changed from a first frame to a second frame and so forth until reaching a fifth frame. After the offset of the caption window reaches 10 in the fifth frame, each of the apparatuses 200 and 270 may maintain the offset of the caption window without further changing the offset.

Accordingly, the offset of the caption window may be smoothly converted according to an offset changing graph 1830 of the caption window of the first through fifth frames.

An equation for determining an offset variation between frames, wherein an offset variation between frames is equally determined per frame section as the offset variation between frames at which the caption conversion occurs, is determined based on a linear function according to Relational Expression 1, is only an exemplary embodiment of the caption offset converting speed command "SmoothTransition" according to an exemplary embodiment. Accordingly, each of the apparatuses 200 and 270 may determine the offset variation to be not equal between frames based on the caption offset converting speed command "SmoothTransition" according to an exemplary embodiment.

A size of the offset variation between frames may be set as a real number according to the caption offset converting speed command "SmoothTransition(10, 4)," an offset conversion of a caption window may be set with lesser parameters, and a frame section in which a caption conversion occurs may be precisely assigned.

Figure 19:
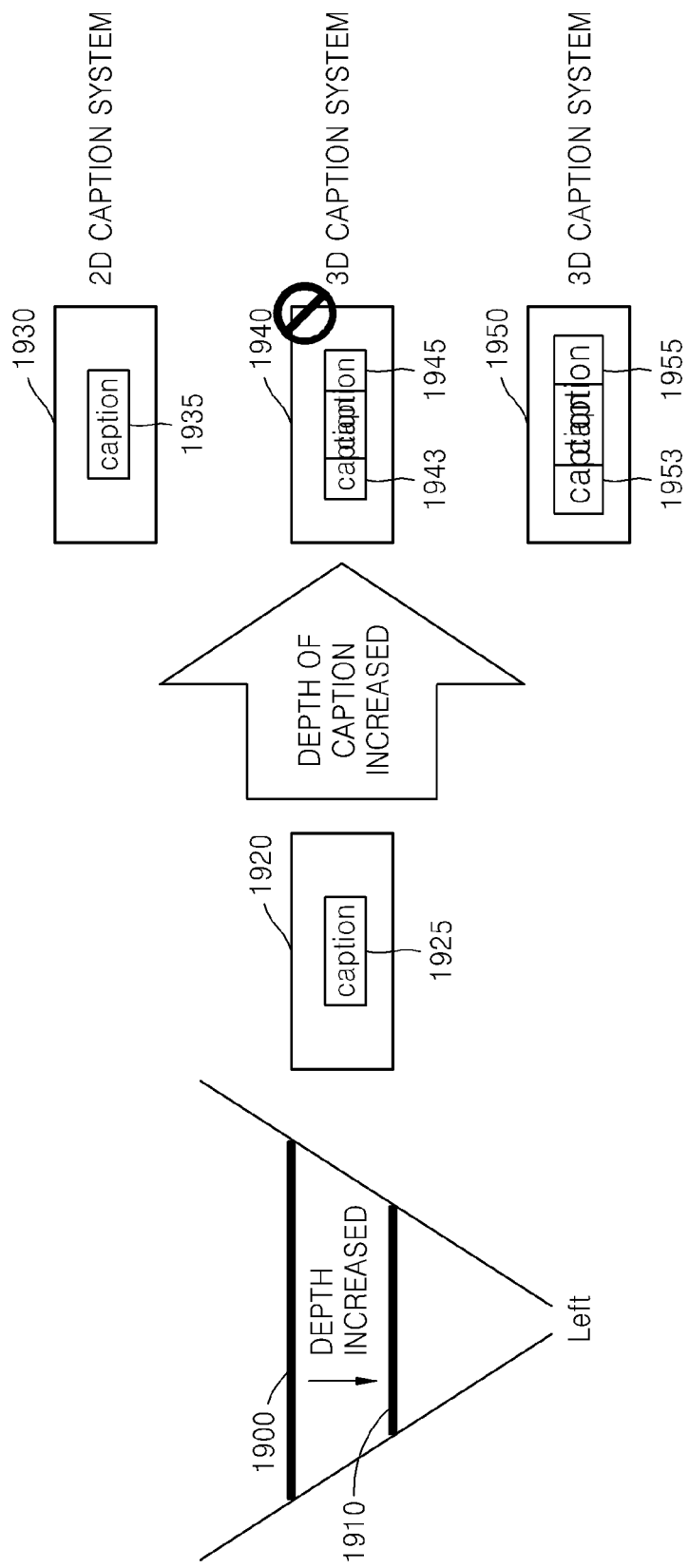
FIG. 19 illustrates a size change of a caption according to a depth change of the caption.

FIG. 19 illustrates a size change of a caption with respect to a depth change of the caption.

When a depth of a first caption 1900 increases to a depth of a second caption 1910, the second caption 1910 is drawn closer to a user than the first caption 1900, and thus it is natural that the second caption 1910 appears larger to the user.

For example, when a depth of a caption increases when a current 2D caption window 1925 is displayed on a current 2D video 1920, a broadcasting stream receiving system supporting only a 2D caption reproduces a 2D video 1930 and a 2D caption window 1935 without any change.

However, when a left view caption window 1943 and a right view caption window 1945 are displayed on a 3D video 1940 in a broadcasting stream receiving system supporting a 3D caption in the same size as the current 2D caption window 1925 without any size adjustment, a TV user may feel visually awkward. Accordingly, when the depth of the caption increases, each of the apparatus 200 and the apparatus 270 may increase sizes of a left view caption window 1953 and a right view caption window 1955 as compared with the current 2D caption window 1925, and a font size of a caption.

Accordingly, the apparatus 100 according to an exemplary embodiment may determine the 3D caption size converting information, including information relating to adjusting a size of a caption window and a size of a caption font. The caption size converting information according to an exemplary embodiment may indicate a ratio for changing a size of caption data.

The apparatus 100 according to an exemplary embodiment may determine the 3D caption size converting command for setting the 3D caption size converting information. Each of the apparatuses 200 and 270 may extract the 3D caption size converting command from the caption service data region of the received bitstream, and increase or decrease the size of the caption window and the font size of the caption in proportion to the change of depth of the caption.

The apparatus 100 according to an exemplary embodiment may determine and insert the 3D caption size converting command into the caption service data region of the digital broadcasting bitstream so as to transport the 3D caption size converting information in conjunction with the caption data, via a DTV bitstream. The 3D caption size converting command according to an exemplary embodiment may set the 3D caption size converting information for each of caption windows of the current caption service.

FIG. 20 illustrates a 3D caption size converting command according to an exemplary embodiment.

A command format of a 3D caption size converting command "SetFontSize" according to an exemplary embodiment may be "SetFontSize(Window_id, Font Scale Factor)." A parameter of the 3D caption size converting command "SetFontSize" according to an exemplary embodiment may include a parameter "Window_id" for identifying a caption window and a parameter "Font Scale Factor" which indicates a ratio of changing a size of caption data.

A command code of the 3D caption size converting command "SetFontSize" according to an exemplary embodiment may be assigned to the a code 0x11 in an extended code region of a DTV-CC code set table.

The parameter "Window_id" indicates an intrinsic identifier of a caption window, and may be assigned by using 3 bits (i.e., id0, id1, and id2).

The parameter "Font Scale Factor" may indicate size fluctuation ratios of a caption window and a font with respect to an offset variation of a video. The parameter "Font Scale Factor" may be assigned by using 13 bits (i.e., sf0, sf1, sf2, sf3, sf4, sf5, sf6, sf7, sf8, sf9, sf10, sf11, and sf12).

Each of the apparatuses 200 and 270 may parse the received digital broadcasting bitstream and extract the 3D font size converting command "SetFontSize" from the caption service data region of the video stream. Each of the apparatuses 200 and 270 may determine a caption window within which an offset conversion occurs based on the 3D caption size converting command "SetFontSize," and adjust the respective sizes of the caption window and the font by reading the respective size fluctuation ratios of the caption window and the font with respect to the offset variation of the video. For example, the font size of the caption may be determined according to Relational Expression 2 below.

Font Size=Anchor Font Size−Video Offset Variation*Anchor Font Size*(Font Size Fluctuation Ratio/100)  [Relational Expression 2]

In particular, if a depth of a video increases to be closer to a TV user, a video offset variation has a negative (−) value, and thus, a font size increases as compared with an anchor font size. Accordingly, as the video depth increases, a font size of a caption may increase.

The apparatus 100 according to an exemplary embodiment may include a parameter for setting the 3D caption size converting information to the caption offset converting speed command according to an exemplary embodiment.

FIG. 21 illustrates a caption offset converting speed command "DisparityStep" for additionally setting 3D caption size converting information, according to an exemplary embodiment.

The caption offset converting speed command "DisparityStep" shown in FIG. 21 includes a parameter "Font Scale Factor" of eight bits which are arranged in accordance with the command format "DisparityStep(Window_id, Target disparity sign, Step size, Target disparity)" of the caption offset converting speed command "DisparityStep" according to an exemplary embodiment as described above with reference to FIG. 15. The parameter "Font Scale Factor" may denote a fluctuation ratio of a current font size as compared with a previous font size.

Each of the apparatuses 200 and 270 according to an exemplary embodiment may read respective fluctuation ratios of sizes of a caption window and a font while reading a caption window within which an offset is to be changed, an offset converting direction and an offset variation of a 3D caption, and a target offset based on the caption offset converting speed command "DisparityStep" of FIG. 21. Accordingly, each of the apparatuses 200 and 270 according to an exemplary embodiment may convert an offset of a predetermined caption window while fluctuating the sizes of the caption window and the font based on the offset converting direction in proportion to the offset variation.

The apparatus 100 according to an exemplary embodiment may insert the 3D caption transport information into the caption service descriptor "caption_service_descriptor" in at least one table region from among a PMT region and an EIT region of the section table region. The 3D caption transport information according to an exemplary embodiment may indicate whether at least one of the 3D caption data, the 3D caption offset information, the caption offset converting speed information, and the 3D caption size converting information is transmitted via the DTV bitstream. The 3D caption transport information according to an exemplary embodiment may be transmitted in conjunction with the caption data by being inserted into at least one of the reserved regions 650, 660, and 670 of the caption service descriptor described above with reference to FIG. 6, in a form of a flag. Table 4 illustrates a syntax of the caption service descriptor "caption_service_descriptor" into which the 3D caption transport information is inserted according to an exemplary embodiment.

TABLE 4

```
Syntax
caption_service_descriptor ( ) {
  descriptor_tag
  descriptor_length
  Reserved
  number_of_services
  for (i=0;i<number_of_services;i++) {
    Language
    cc_type
    Reserved
    if (cc_type==line21) {
      Reserved
      line21_field
    }
    Else
      caption_service_number
      easy_reader
      wide_aspect_ratio
      korean_code
      3d_cc_enable
      Reserved
    }
  }
}
```

A parameter "3d_cc_enable" is an example of the 3D caption transport information according to an exemplary embodiment. When a value of "3d_cc_enable" is 0, the 3D caption information may be included in a current bitstream, and when the value of "3d_cc_enable" is 1, the 3D caption information may not be included in the current bitstream.

Information relating to a location where the 3D caption transport information according to an exemplary embodiment is inserted may be inserted into a five-bit reserved region.

Each of the apparatuses 200 and 270 according to an exemplary embodiment may determine a caption reproduction mode relating to the current bitstream by extracting the parameter "3d_cc_enable" according to an exemplary embodiment. The caption reproduction mode according to an exemplary embodiment may be determined to be any one of four modes.

In a first caption reproduction mode, the 3D caption information is included in the current bitstream, and a 3D caption is reproduced when a 3D video is reproduced.

In a second caption reproduction mode, the 3D caption information is not included in the current bitstream, but when a 3D video is reproduced, an offset may be forcibly added to caption data so that a caption is reproduced in 3D, or a phrase indicating that a 3D caption is not supported may be reproduced.

In a third caption reproduction mode, the 3D caption information is included in the current bitstream but a 2D video is reproduced, and caption data is reproduced as a 3D or 2D caption based on at least one of a user selection and a predetermined setting.

Further, in a fourth caption reproduction mode, the 3D caption information is included in the current bitstream but a 2D video is reproduced, and caption data is reproduced in 2D.

Accordingly, each of the apparatuses 200 and 270 according to an exemplary embodiment may extract the parameter "3d_cc_enable" according to an exemplary embodiment in order to determine the caption reproduction mode of the current bitstream to be any one of the first, second, third, and fourth caption reproduction mode, and prepare a caption reproduction state based on the determined caption reproduction mode.

Alternatively, the apparatus 100 according to an exemplary embodiment may generate the 3D caption transport descriptor including the 3D caption transport information, and insert the 3D caption transport descriptor into a descriptor region of at least one table region from among the PMT and EIT regions. Table 5 illustrates a syntax of the 3D caption transport descriptor "3d_cc_descriptor" according to an exemplary embodiment.

TABLE 5

```
Syntax
3d_cc_descriptor( ) {
  descriptor_tag
  descriptor_length
  3d_cc_enable
  Reserved
}
```

A parameter "3d_cc_enable" may be a flag indicating whether at least one of the 3D caption data, the 3D caption offset information, the caption offset converting speed information, and the 3D caption size converting information is included in the current bitstream.

Each of the apparatuses 200 and 270 according to an exemplary embodiment may extract the 3D caption transport information indicating that the 3D caption converting information is transmitted via the current bitstream from the caption service descriptor in at least one of the PMT and EIT regions. When it is determined that the 3D caption information is included in the current bitstream based on the 3D caption transport information, each of the apparatuses 200 and 270 according to an exemplary embodiment may extract the 3D caption information from at least one of the caption service block, the caption window command, and the section table region.

Each of the apparatuses 200 and 270 according to an exemplary embodiment may determine that the 3D caption transport information is inserted into the received DTV bitstream based on the 3D caption transport information. Accordingly, the extractor 220 according to an exemplary embodiment may extract information confirming that at least one of the 3D caption offset information, the caption offset converting speed information, and the 3D caption size converting information is inserted into the DTV bitstream, based on the 3D caption transport information.

Each of the apparatuses 200 and 270 according to an exemplary embodiment may extract the 3D caption transport information indicating that the 3D caption information is transmitted from the caption service descriptor in one of the PMT and EIT regions. Alternatively, each of the apparatuses 200 and 270 according to an exemplary embodiment may extract the 3D caption transport information indicating that the 3D caption information is transmitted from the descriptor region in one of the PMT and EIT regions.

Figure 22:
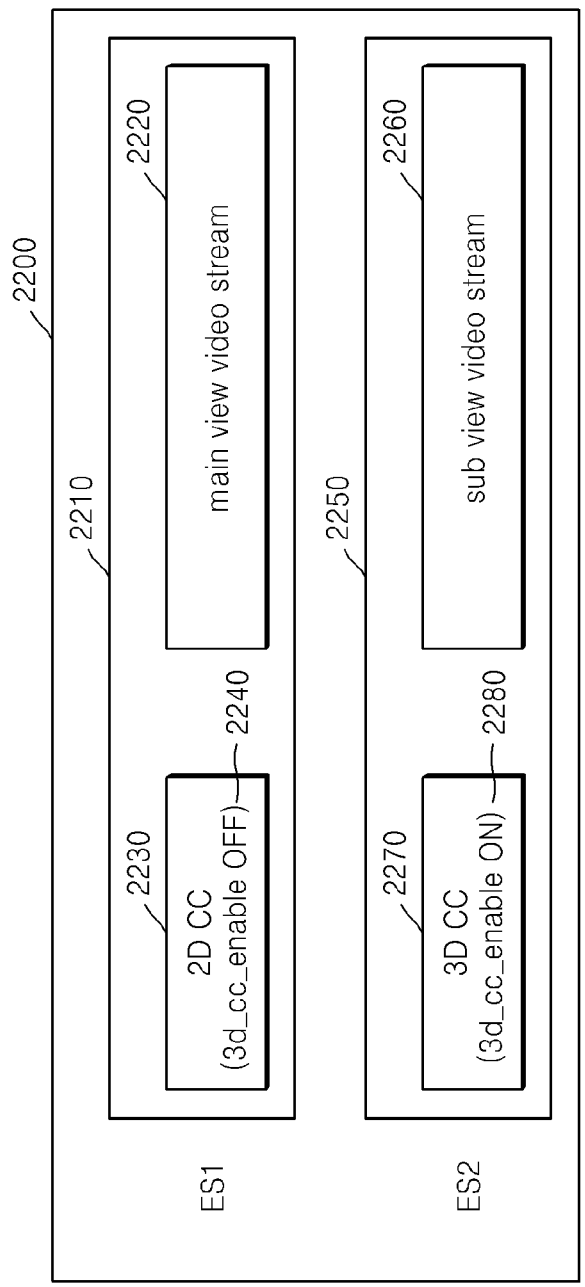
FIG. 22 illustrates a case where 2D DTV-CC information and 3D DTV-CC information are respectively included in two elementary streams in a system for transporting the two elementary streams, according to an exemplary embodiment.

FIG. 22 illustrates a case in which 2D DTV-CC information and 3D DTV-CC information are respectively included in two elementary streams in a system for transmitting the two elementary streams according to an exemplary embodiment.

The apparatus 100 according to an exemplary embodiment may transmit one digital broadcasting stream 2200 by multiplexing two video elementary streams 2210 and 2250 respectively including a main view video stream 2220 and a sub view video stream 2260, in order to transport 3D video data. In particular, the 3D caption information may not be transmitted for each of the video elementary streams 2210 and 2250, but 3D caption transport information 2240 and 2280 indicating whether 3D caption information is included in a current stream may be respectively inserted into each of video elementary streams 2210 and 2250.

For example, the video elementary stream 2250 including 3D caption information 2270 may set the 3D caption transport information 2280, i.e., "3d_cc_enable" to "ON" to indicate that the 3D caption information 2270 is included in the video elementary stream 2250. Because the remaining video elementary stream 2210 includes caption data 2230 and not 3D caption information, the 3D caption transport information 2240, i.e., "3d_cc_enable," may be set to "OFF" to indicate that 3D caption information is not included in the video elementary stream 2210. In particular, each of the apparatuses 200 and 270 according to an exemplary embodiment may extract the respective 3D caption transport information 2240 and 2280 from the corresponding video elementary streams 2210 and 2250, and extract the 3D caption information 2270 from the video elementary stream 2250 within which the 3D caption transport information 2280 is set to "ON."

Each of the apparatuses 200 and 270 according to an exemplary embodiment may receive a digital broadcasting bitstream in which 3D caption information is included in both of two video elementary streams. In particular, when the two video elementary streams have a relationship regarding a main elementary stream and a sub elementary stream, each of the apparatuses 200 and 270 according to an exemplary embodiment may determine a 3D caption by extracting the 3D caption information from the main elementary stream.

However, when the two video elementary streams do not have a relationship regarding a main elementary stream and a sub elementary stream, a 3D caption may be determined by extracting 3D caption information from a video elementary stream that is arbitrarily selected.

A 2D broadcasting stream receiving system that supports only a 2D video and a 2D caption is unable to read a 3D video and 3D caption information, even when a broadcasting stream including the 3D video and the 3D caption information is received. For lower compatibility with such a 2D broadcasting stream receiving system, the apparatus 100 according to an exemplary embodiment may transport two video elementary streams by including main view video data and caption data in a main elementary stream from among the two video elementary streams, and including sub view video data and 3D caption information in a sub elementary stream.

In this case, because the 2D broadcasting stream receiving system is unable to access the sub elementary stream from among the two video elementary streams and only parses and decodes the main elementary stream, the 2D broadcasting stream receiving system may read and reproduce the main view video data and the caption data.

Each of the apparatuses 200 and 270 according to an exemplary embodiment may parse the main elementary stream from among the two video elementary streams to read the main view video data and the caption data, and parse the sub elementary stream to read the sub view video data and the 3D caption information.

Accordingly, the 3D video may be reproduced as the main view video and the sub view video are restored. Further, caption content is determined by using the caption data extracted from the main elementary stream, and respective locations and sizes of the main view caption window and the sub view caption window and a font size are determined by using the 3D caption information extracted from the sub elementary stream. Accordingly, the apparatus 270 according to an exemplary embodiment combines the main view video and the main view caption window and also combines the sub view video and the sub view caption window to form a 3D video sequence, thereby reproducing a 3D caption with a 3D video.

Figure 23:
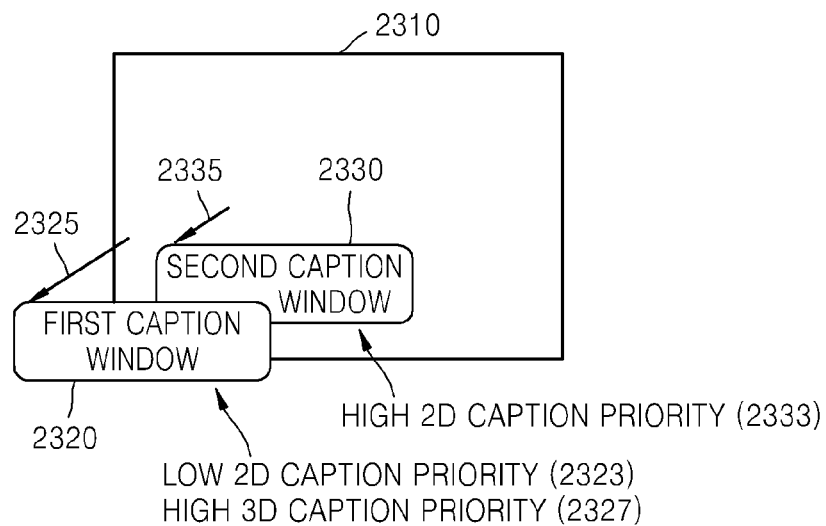
FIGS. 23 and 24 are diagrams for describing a method of reproducing a caption window when two or more caption windows configured according to an exemplary embodiment collide with each other.
Figure 24:
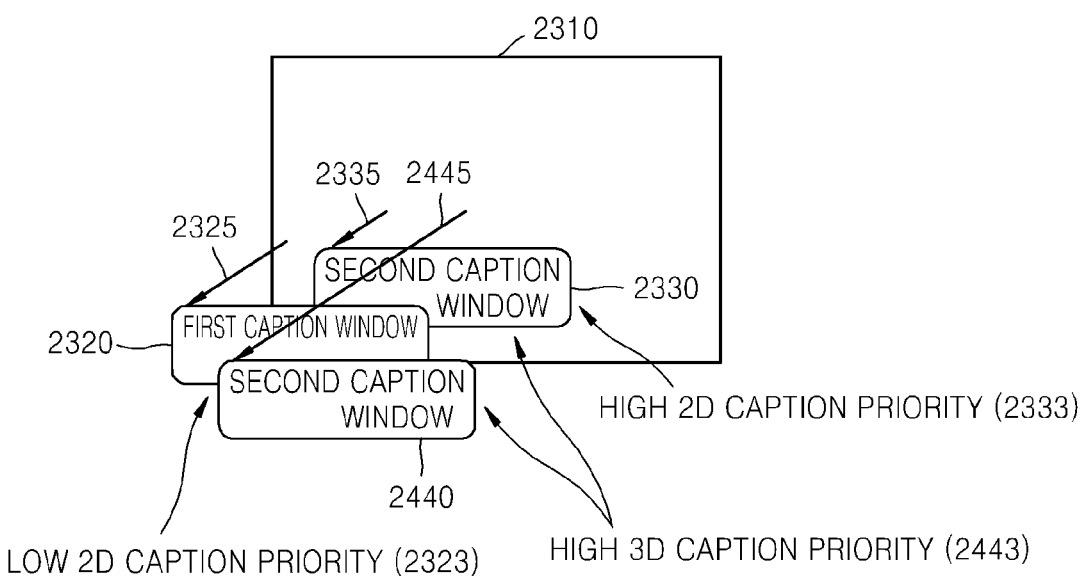

FIGS. 23 and 24 are diagrams for describing a method for reproducing a caption window when two or more caption windows configured according to an exemplary embodiment collide with each other.

When 2D caption windows overlap with each other, a 2D caption priority is assigned to each of the overlapping 2D caption windows to designate a 2D caption window to be seen.

The apparatus 270 according to an exemplary embodiment may generate a plurality of caption windows, and may also generate the main view caption window and the sub view caption window to which different offsets are applied with respect to one caption window for 3D caption reproduction. Accordingly, an occlusion region may be generated between a plurality of 3D caption windows, separately from the 2D caption priority.

Accordingly, the apparatus 270 according to an exemplary embodiment may determine a 3D caption priority between overlapping caption windows based on a respective offset assigned to each of the overlapping caption windows for 3D caption reproduction, separately from the 2D caption priority with respect to the 2D caption windows.

In particular, for example, a first caption window 2320 may cover a second caption window 2330 because a 2D caption priority 2323 of the first caption window 2320 is lower than a 2D caption priority 2333 of the second caption window 2330, but a first offset 2325 from a video zero-plane 2310 to the first caption window 2320 is higher than a second offset 2335 from the video zero-plane 2310 to the second caption window 2330.

The apparatus 270 according to an exemplary embodiment may determine a 3D caption priority of a caption window so as to overcome an occlusion phenomenon of a 3D caption window.

According to a first method for determining a 3D caption priority, the apparatus 270 according to an exemplary embodiment may ignore the respective 2D caption priorities 2323 and 2333 of the corresponding first and second caption windows 2320 and 2330, and determine a 3D caption priority between overlapping caption windows based on the respective first and second offsets of the corresponding first and second caption windows 2320 and 2330. In particular, a high 3D caption priority 2327 may be determined for the first caption window 2320 as compared with the second caption window 2330.

According to a second method for determining a 3D caption priority, the apparatus 270 according to an exemplary embodiment may determine respective 3D caption priorities of the corresponding first and second caption windows 2320 and 2330 based on the respective 2D caption priorities 2323 and 2333 of the corresponding first and second caption windows 2320 and 2330. In particular, the 2D caption priority 2333 of the second caption window 2330 precedes the 2D caption priority 2323 of the first caption window 2320 even when the first caption window 2320 covers the second caption window 2330, because the first offset 2325 of the first caption window 2320 is higher than the second offset 2335 of the second caption window 2330, and thus the apparatus 270 according to an exemplary embodiment may assign a high 3D caption priority 2443 to the second caption window 2330 as compared with the first caption window 2320.

Further, the apparatus 270 according to an exemplary embodiment may determine a new location of a second caption window 2440 by newly assigning an offset 2445 to the second caption window 2330 which is greater than the first offset 2325 of the first caption window 2320, so as to prevent the second caption window 2330 which is assigned with the high 3D caption priority 2443 from being covered by the first caption window 2320 which has a relatively low 3D caption priority.

According to the second method, a 2D caption priority assigned to an original caption window may be used, but an original offset of a 3D caption may be changed. Conversely, according to the first method, an original offset of a 3D caption may be maintained, but a 2D caption priority of an original caption window may be ignored.

Operation principles of the apparatuses 100 and 200 have been described based on a closed caption and transmitting and receiving of 3D caption converting information relating to 3D reproduction of the closed caption according to an exemplary embodiment. However, the operation principles described above are only an example of using the apparatuses 100 and 200, and a digital broadcasting system for using the above-described operation principles is not limited to a closed caption system.

Figure 25:
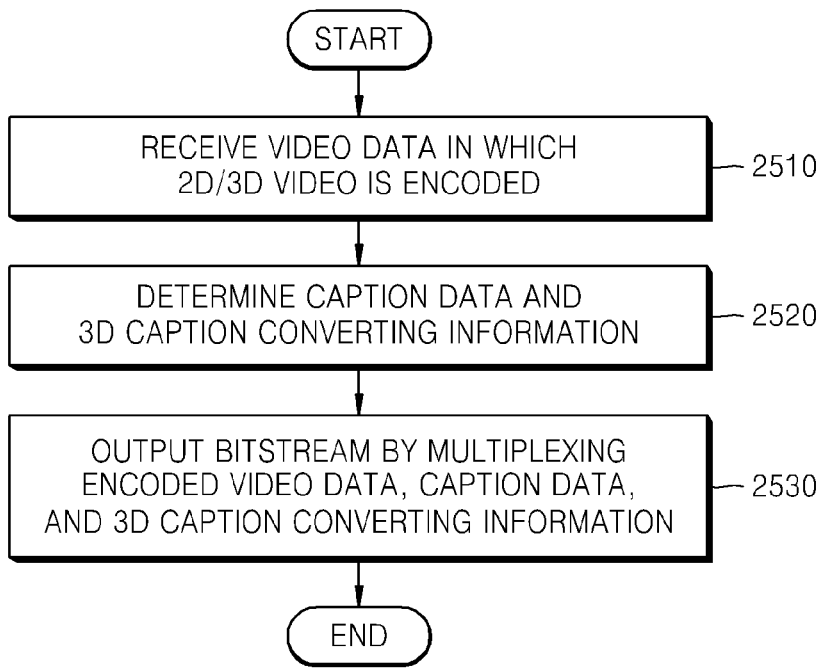
FIG. 25 is a flowchart illustrating a method of generating a digital broadcasting bitstream for a digital caption broadcast, according to an exemplary embodiment.

FIG. 25 is a flowchart which illustrates a method for generating a digital broadcasting bitstream for a digital caption broadcast, according to an exemplary embodiment.

In operation 2510, video data, in which a video including at least one of a 2D video and a 3D video is encoded, is received.

In operation 2520, caption data and 3D caption converting information which includes caption offset converting speed information are determined. The 3D caption converting information according to an exemplary embodiment may include at least one of 3D caption offset information, caption offset converting speed information, 3D caption size converting information, and 3D caption transport information.

The 3D caption offset information according to an exemplary embodiment may indicate an offset of a depth, a disparity, or a binocular parallax of a main view caption window and a sub view caption window.

The caption offset converting speed information according to an exemplary embodiment may include information relating to an offset variation and an offset direction between caption windows of a current frame and a following frame, and a target offset.

Further, the caption offset converting speed information according to an exemplary embodiment may include information relating to a target offset and a number of frames at which a caption conversion occurs.

The 3D caption size converting information according to an exemplary embodiment may include information relating to a ratio for changing sizes of a caption window and a caption font.

The 3D caption transport information according to an exemplary embodiment may indicate whether at least one of the 3D caption offset information, the caption offset converting speed information, and the 3D caption size converting information is transmitted via a current bitstream.

In operation 2530, a bitstream for a digital broadcast is output by multiplexing the video data, the caption data, and the 3D caption converting information. The caption data may be inserted into at least one of a caption service data region and a section table region of a user data region of the bitstream, and the 3D caption converting information may be inserted into at least one of a caption service block, a caption window command, and a section table region of the bitstream.

A 3D caption service block which includes the 3D caption offset information according to an exemplary embodiment may be generated and transported in conjunction with caption data in a service layer. The caption data according to an exemplary embodiment may include at least one of CEA-608 closed caption data and CEA-708 closed caption data.

A 3D caption window command according to an exemplary embodiment for setting the 3D caption offset information, the caption offset converting speed information, and the 3D caption size converting information may be determined, and the 3D caption window command may be inserted into the caption service data region of the bitstream and transported via the bitstream. The 3D caption window command may set various pieces of information for a 3D caption for each of a plurality of caption windows of a current caption service.

The 3D caption converting information according to an exemplary embodiment, such as, for example, the 3D caption offset information, the caption offset converting speed information, the 3D caption size converting information, and the 3D caption transport information, may be transported by being inserted into a descriptor region or a reserved region of a caption service descriptor in an PMT or EIT region of the section table region.

Figure 26:
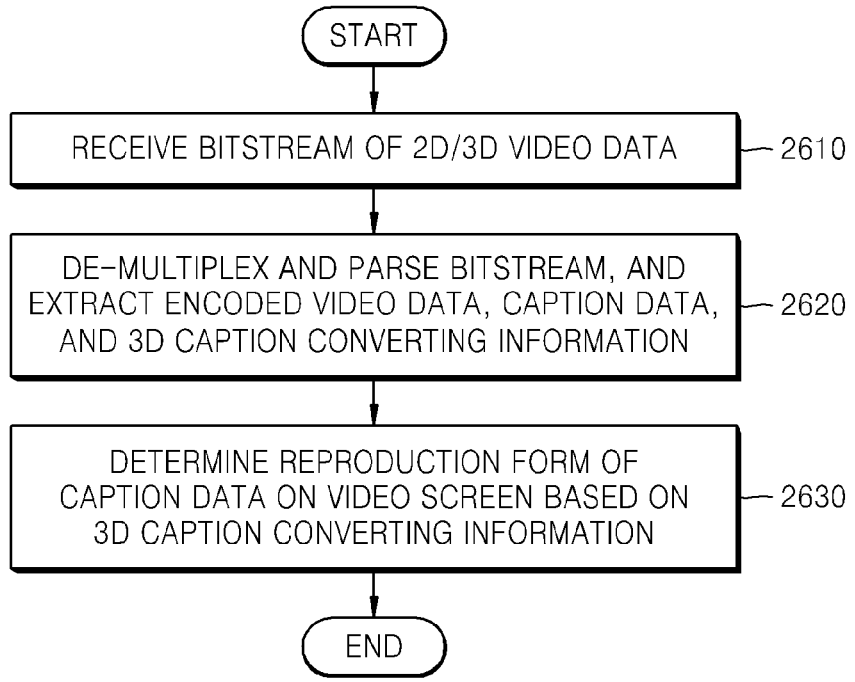
FIG. 26 is a flowchart illustrating a method of receiving a digital broadcasting bitstream for a digital caption broadcast, according to an exemplary embodiment.

FIG. 26 is a flowchart which illustrates a method for receiving a digital broadcasting bitstream for a digital caption broadcast, according to an exemplary embodiment.

In operation 2610, a bitstream which includes video data in which at least one of a 2D video and a 3D video is encoded is received.

In operation 2620, the received bitstream is de-multiplexed and parsed, and encoded video data, caption data, and 3D caption converting information which includes caption offset converting speed information may be extracted from the bitstream.

The caption data may be extracted from at least one of a caption service data region and a section table region of a user data region of a digital broadcasting bitstream, and the 3D caption converting information may be extracted from at least one of a caption service block, a caption window command, and a section table region of a bitstream.

The 3D caption offset information may be received as part of a 3D caption service block according to an exemplary embodiment together with caption data included in another service block. Caption data including at least one of CEA-608 closed caption data and CEA-708 closed caption data may be received.

The 3D caption window command according to an exemplary embodiment for setting 3D caption offset information, caption offset converting speed information, and 3D caption size converting information may be extracted from the caption service data region of the bitstream. Because the 3D caption window command provides various pieces of information for a 3D caption for each of a plurality of caption windows of a current caption service, a location, a size, and a font size of a 3D caption window may be determined based on the 3D caption window command.

3D caption converting information according to an exemplary embodiment, such as, for example, 3D caption offset information, caption offset converting speed information, 3D caption size converting information, and 3D caption transport information, may be extracted from a descriptor region of a reserved region of a caption service descriptor in a PMT or EIT region of a section table region.

A determination is made as to whether at least one of the 3D caption data, the 3D caption offset information, the caption offset converting speed information, and the 3D caption size converting information are included in a current bitstream based on the 3D caption transport information according to an exemplary embodiment, and the 3D caption information may be extracted if included.

In operation 2630, a reproduction form of a caption on a video screen may be determined based on the 3D caption converting information.

A caption window within which a 3D caption conversion occurs and a location and a size of the caption window and a font size may be determined based on the extracted 3D caption offset information, the extracted caption offset converting speed information, and the extracted 3D caption size converting information according to an exemplary embodiment.

A respective offset variation between caption windows of a current frame and a following frame is determined based on the caption offset converting speed information according to an exemplary embodiment, and thus a respective location of a caption window for each of a plurality of frames may be determined.

A fluctuation ratio of a size of a caption in proportion to a depth variation may be determined based on the 3D caption size converting information according to an exemplary embodiment, and thus sizes of a caption window and a font may be determined.

The video data may be decoded in order to be reconstructed into a 2D or 3D video, and the caption data may be reproduced as a 3D caption and displayed on a video screen according to the reproduction form determined based on the 3D caption converting information. The reproduction form according to an exemplary embodiment may include respective locations and sizes of a main view caption window and a sub view caption window, a size of a caption font, and a 3D caption priority of a caption window.

A main view caption and a sub view caption are respectively combined into a main view video and a sub view video of the reconstructed 3D video, and a 3D caption may be reproduced in conjunction with the 3D video while a main view screen in which the main view caption and the main view video are combined and a sub view screen in which the sub view caption and the sub view video are combined are reproduced.

When a plurality of caption windows are generated, respective 3D caption priorities are determined based on corresponding original 2D caption priorities of the caption windows, and thus, respective reproduction locations of the caption windows may be determined. Alternatively, the respective 3D caption priorities may be determined based on corresponding offsets of the caption windows, and thus the respective reproduction locations of the caption windows may be determined.

Each of the apparatus 100 and the apparatuses 200 and 270 according to an exemplary embodiment may transmit and receive at least one of the 3D caption converting information, the 3D caption offset information, the caption offset converting speed information, the 3D caption size converting information, and the 3D caption transport information according to an exemplary embodiment by using a service block according to a general communication standard, a caption window command, or a space in a section table region.

Accordingly, even when a general broadcasting receiving system is unable to interpret at least one of the 3D caption converting information, the 3D caption offset information, the caption offset converting speed information, the 3D caption size converting information, and the 3D caption transport information, which are newly assigned or defined according to an exemplary embodiment, the general broadcasting receiving system is able to receive a digital broadcast solely by interpreting the service block according to a general communication standard, the caption window command, or the section table region, and thus, a reduction of requirements for compatibility with respect to general broadcasting systems may be achieved.

Further, a 3D broadcast program that appears visually natural to a TV viewer may be provided because a 2D caption reproducing state and a 3D caption reproducing state may be prevented from being rapidly switched based on the 3D caption converting information according to an exemplary embodiment, a caption size may be adjusted in proportion to a change of a caption depth, and a reproduction order may be set by assigning respective relative 3D caption priorities between a plurality of caption windows that overlap with each other.

In the above description, various examples of using the 3D caption converting information, the 3D caption offset information, the caption offset converting speed information, the 3D caption size converting information, and the 3D caption transport information have been described with reference to FIGS. 1 to 26 and Tables 1 to 5. However, the above-described examples are just exemplary embodiments for describing a principle of the present disclosure, and thus, the 3D caption converting information, the 3D caption offset information, the caption offset converting speed information, the 3D caption size converting information, and the 3D caption transport information are not limited to those shown in FIGS. 1 to 26 and Tables 1 to 5.

It would be interpreted by one of ordinary skill in the art that the block diagrams described in the exemplary embodiments conceptually indicate a circuit for realizing the principles of the present disclosure. Similarly, it would be obvious to one of ordinary skill in the art that a predetermined flowchart, a flow graph, a state disparity diagram, and a pseudo code are substantially expressed in a computer-readable recording medium and indicate various processes executed by a computer or a processor, even if the computer or processor is not explicitly shown. Accordingly, the exemplary embodiments can be written as computer programs and can be implemented in general-use digital computers that execute the programs using a non-transitory or transitory computer readable recording medium. Examples of the non-transitory computer readable recording medium include magnetic storage media (e.g., ROM, floppy disks, hard disks, etc.), optical recording media (e.g., CD-ROMs, or DVDs), etc.

The functions of various elements shown in diagrams may be provided by using not only hardware for executing software by being linked to suitable software, but also exclusive hardware. When the functions are provided by a processor, the functions may be provided by a single exclusive processor, a single common processor, or a plurality of individual processors, wherein some processors are shared. Further, the terms "processor" and/or "controller" shall not be interpreted to exclusively indicate hardware for executing software, and may unlimitedly and implicitly include digital signal processor (DSP) hardware, read-only memory (ROM) for storing software, random access memory (RAM), and nonvolatile storage device.

In the claims, an element expressed as a unit for performing a certain function may include a predetermined method of performing the certain function, and may include a combination of circuit elements for performing the certain function, or software in a predetermined form including firmware or microcode combined with a suitable circuit for executing software for performing the certain function.

In the present disclosure, "an embodiment" and other modified expressions mean that a certain feature, structure, or characteristic is included in at least one embodiment of the present disclosure. Accordingly, the expression "an embodiment" and other modified examples in the present disclosure may not denote the same embodiment.

In the present disclosure, the expression "at least one from among A and B" is used to include a selection of only A, only B, or both A and B. Further, the expression "at least one from among A through C" may be used to include a selection of only A, only B, only C, only A and B, only B and C, or all of A, B, and C. One of ordinary skill in the art would be able to clearly interpret similar expression with more elements.

The exemplary embodiments have been described above.

While the present disclosure has been particularly shown and described with reference to exemplary embodiments thereof, it will be understood by those of ordinary skill in the art that various changes in form and details may be made therein without departing from the spirit and scope of the disclosure as defined by the appended claims. The exemplary embodiments should be considered in descriptive sense only and not for purposes of limitation. Therefore, the scope of the present disclosure is defined not by the detailed description of the exemplary embodiments but by the appended claims, and all differences within the scope will be construed as being included in the present disclosure.

The invention claimed is:

1. A method for generating a broadcasting bitstream for a digital caption broadcast, the method comprising:
receiving video data in which a video comprising at least one of a two-dimensional (2D) video and a three-dimensional (3D) video is encoded;
determining caption data for reproduction in conjunction with the video, and 3D caption converting information comprising information relating to a converting speed of an offset for reproducing the caption data as a 3D caption; and
outputting a bitstream for a digital broadcast by multiplexing the received video data, the determined caption data, and the determined 3D caption converting information,
wherein the determining the 3D caption converting information comprises determining caption offset converting speed information comprising target offset information indicating a target offset of a caption window and caption converting section information indicating a section within which a caption offset is converted.

2. The method of claim 1, wherein the determining the 3D caption converting information comprises determining 3D caption offset information comprising at least one of a depth, a disparity, and a binocular parallax between a main view caption and a sub view caption, and
the outputting the bitstream comprises:
generating a 3D caption service block comprising the 3D caption offset information; and
inserting the generated 3D caption service block into a user data region of a video stream of the bitstream.

3. The method of claim 1, wherein
the outputting the bitstream comprises:
determining a caption offset converting speed command for setting the caption offset converting speed information, based on a format of a caption window command; and
inserting the caption offset converting speed command into a caption service data region of a video stream,
wherein the caption converting section information indicates a number of frames from a frame at which a caption conversion is started to a frame at which the caption conversion is completed.

4. The method of claim 1, wherein the determining the 3D caption converting information comprises determining 3D caption size converting information for adjusting a size of the 3D caption in order to reproduce the caption data after converting a caption offset of the caption data, and
the outputting the bitstream comprises:
determining a 3D caption size converting command for setting the 3D caption size converting information, based on a format of a caption window command; and
inserting the 3D caption size converting command into a caption service data region of a video stream,
wherein the 3D caption size converting information indicates a ratio of converting the size of the 3D caption.

5. The method of claim 1, wherein the outputting the bitstream comprises inserting 3D caption transport information indicating that the 3D caption converting information is transported via the bitstream into a caption service descriptor in at least one table region from among a program map table (PMT) region and an event information table (EIT) region of a section table region.

6. A method for receiving a broadcasting bitstream for a digital caption broadcast, the method comprising:
receiving a bitstream comprising encoded video data which includes at least one of a two-dimensional (2D) video and a three-dimensional (3D) video;
extracting the encoded video data, caption data for reproduction in conjunction with a video, and 3D caption converting information comprising information relating to a converting speed of an offset for reproducing the caption data as a 3D caption from the bitstream by de-multiplexing and parsing the received bitstream; and determining a reproducing form of the caption data relating to displaying the reproduced caption data as a 3D caption on a video screen, based on the extracted 3D caption converting information, wherein the extracting comprises extracting a caption offset converting speed command from a caption service data region of a video stream relating to the bitstream, and the determining of the reproducing form comprises reading caption offset converting speed information comprising target offset information indicating a target offset of a 3D caption window and caption offset converting section information indicating a section within which a caption offset is converted, from a caption service data region of the bitstream based on the extracted caption offset converting speed command.

7. The method of claim 6, further comprising:
reconstructing a video which includes at least one of the 2D video and the 3D video by decoding the encoded video data; and
reproducing the caption data and displaying the reproduced caption data as a 3D caption on the video screen based on the determined reproducing form of the caption data.

8. The method of claim 6, wherein the extracting comprises:
extracting a 3D caption service block from a user data region of a video stream of the bitstream; and
extracting, from the extracted 3D caption service block, 3D caption offset information comprising at least one of a depth, a disparity, and a binocular parallax between a main view point caption and a sub view caption, and
the determining of the reproducing form comprises determining a location of a main view caption window and a location of a sub view caption window based on the extracted 3D caption offset information.

9. The method of claim 6, wherein
the determining of the reproducing form further comprises:
determining an offset of a main view caption window and an offset of a sub view caption window for each of a plurality of frames, based on the read caption offset converting speed information;
determining a number of frames from a frame at which a caption conversion is started to a frame at which the caption conversion is completed, based on the read caption converting section information; and
determining a location of the main view caption window and a location the sub view caption window based on the determined respective offsets determined for each of the plurality of frames and the determined number of frames.

10. The method of claim 6, wherein the extracting comprises extracting a 3D caption size converting command from a caption service data region of a video stream relating to the bitstream, and
the determining comprises:
reading 3D caption size converting information for adjusting a size of the 3D caption, based on the extracted 3D caption size converting command;
determining a ratio for converting a size of the caption data, based on the extracted 3D caption size converting information; and
determining a size of at least one of a caption window and a caption font based on the determined ratio.

11. The method of claim 6, wherein the extracting comprises:
extracting 3D caption transport information indicating that the 3D caption converting information is transported via the bitstream, from a caption service descriptor in at least one table region from among a program map table (PMT) region and an event information table (EIT) region of a section table region; and
when a determination is made that the 3D caption converting information is included in the bitstream based on the extracted 3D caption transport information, extracting the 3D caption converting information from at least one of a caption service block, a caption window command, and a section table region.

12. An apparatus for generating a broadcasting bitstream for a digital caption broadcast, the apparatus comprising:
a video data receiver configured to receive video data in which a video comprising at least one of a two-dimensional (2D) video and a three-dimensional (3D) video is encoded by a video encoding processor;
a 3D caption converting information determiner configured to determine caption data for reproduction in conjunction with the video, and 3D caption converting information comprising information relating to a converting speed of an offset for reproducing the caption data as a 3D caption; and
a bitstream output unit configured to output a bitstream for a digital broadcast by multiplexing the received video data, the determined caption data, and the determined 3D caption converting information,
wherein the 3D caption converting information further comprises target offset information indicating a target offset of a caption window and caption converting section information indicating a section within which a caption offset is converted.

13. An apparatus for receiving a broadcasting bitstream for a digital caption broadcast, the apparatus comprising:
a bitstream receiver configured to receive a bitstream comprising encoded video data which includes at least one of a two-dimensional (2D) video and a three-dimensional (3D) video;
an extractor configured to extract the encoded video data, caption data for reproduction in conjunction with a video, and 3D caption converting information comprising information relating to a converting speed of an offset for reproducing the caption data as a 3D caption from the bitstream by de-multiplexing and parsing the received bitstream; and
a caption determiner configured to determine a reproducing form of the caption data relating to displaying the reproduced caption data as a 3D caption on a video screen based on the extracted 3D caption converting information,
wherein the extractor is further configured to extract a caption offset converting speed command from a caption service data region of a video stream relating to the bitstream, and
the caption determiner is further configured to determine the reproducing form by reading caption offset converting speed information comprising target offset information indicating a target offset of a 3D caption window and caption offset converting section information indicating a section within which a caption offset is converted, from a caption service data region of the bitstream based on the extracted caption offset converting speed command.

14. A non-transitory computer-readable recording medium having recorded thereon a program that is executable by a processor to perform the method of claim 1.

15. A non-transitory computer-readable recording medium having recorded thereon a program that is executable by a processor to perform the method of claim 6.

* * * * *